United States Patent

Azuma

(10) Patent No.: US 12,163,827 B2
(45) Date of Patent: Dec. 10, 2024

(54) CONTROL DEVICE, CONTROL METHOD, NON-TRANSITORY COMPUTER-READABLE STORAGE MEDIUM STORING CONTROL PROGRAM

(71) Applicant: DENSO CORPORATION, Kariya (JP)

(72) Inventor: Kenta Azuma, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 18/442,286

(22) Filed: Feb. 15, 2024

(65) Prior Publication Data

US 2024/0192051 A1    Jun. 13, 2024

Related U.S. Application Data

(63) Continuation of application No. PCT/JP2022/033239, filed on Sep. 5, 2022.

(30) Foreign Application Priority Data

Sep. 27, 2021 (JP) .................. 2021-156822
Aug. 25, 2022 (JP) .................. 2022-134420

(51) Int. Cl.
*G01J 1/42* (2006.01)
*G01J 1/44* (2006.01)

(52) U.S. Cl.
CPC ............... *G01J 1/4228* (2013.01); *G01J 1/44* (2013.01); *G01J 2001/4466* (2013.01)

(58) Field of Classification Search
CPC .......... G01J 1/42; G01J 1/4204; G01J 1/4228; G01J 1/44; G01J 2001/4238; G01J 2001/4242; G01J 2001/4266; G01J 2001/428; G01J 2001/4413; G01J 2001/442; G01J 2001/4446; G01J 2001/446; G01J 2001/4466
See application file for complete search history.

(56) References Cited

U.S. PATENT DOCUMENTS

| | | | |
|---|---|---|---|
| 11,754,686 B2 * | 9/2023 | Henderson | ........ H01L 31/02027 356/5.01 |
| 2018/0031420 A1 | 2/2018 | Dyba | |
| 2020/0132817 A1 | 4/2020 | Ueno et al. | |
| 2022/0373689 A1 * | 11/2022 | Bronstein | ............... G01S 17/89 |
| 2024/0012149 A1 * | 1/2024 | Assmann | ............... G01S 7/4816 |
| 2024/0192051 A1 * | 6/2024 | Azuma | ..................... G01J 1/44 |

* cited by examiner

*Primary Examiner* — John R Lee

(74) *Attorney, Agent, or Firm* — Posz Law Group, PLC

(57) ABSTRACT

By a control device, a control method, or a non-transitory tangible storage medium storing a control program for controlling an optical sensor that includes a plurality of single photon avalanche diodes for each light reception pixel and receives light from a sensing area, a light reception signal waveform is acquired. The light reception signal waveform includes: a reflection light output component; and an external light output component, and a reflection intensity of the reflection light is estimated based on a correlation between a reflection light response number and an external light response number.

12 Claims, 21 Drawing Sheets

FIG. 25

CONTROL DEVICE, CONTROL METHOD, NON-TRANSITORY COMPUTER-READABLE STORAGE MEDIUM STORING CONTROL PROGRAM

CROSS REFERENCE TO RELATED APPLICATIONS

The present application is a continuation application of International Patent Application No. PCT/JP2022/033239 filed on Sep. 5, 2022, which designated the U.S. and claims the benefit of priority from Japanese Patent Application No. 2021-156822 filed on Sep. 27, 2021 and the benefit of priority from Japanese Patent Application No. 2022-134420 filed on Aug. 25, 2022. The entire disclosures of all of the above applications are incorporated herein by reference.

TECHNICAL FIELD

The present disclosure relates to a control technology for controlling an optical sensor.

BACKGROUND

An optical sensor in which (SPADs) single photon avalanche diodes are arranged for each light reception pixel and receive light from a sensing area has been known. For example, in an optical sensor of a comparative example, a distance to a target is measured based on a timing when a maximum value of the number of responses of SPAD for each detection area corresponding to a light reception pixel.

SUMMARY

By a control device, a control method, or a non-transitory tangible storage medium storing a control program for controlling an optical sensor that includes a plurality of single photon avalanche diodes for each light reception pixel and receives light from a sensing area, a light reception signal waveform is acquired. The light reception signal waveform includes: a reflection light output component; and an external light output component, and a reflection intensity of the reflection light is estimated based on a correlation between a reflection light response number and an external light response number.

BRIEF DESCRIPTION OF THE DRAWINGS

FIG. 25 is a diagram showing a correlation table according to the fifth embodiment.

DETAILED DESCRIPTION

Figure 1:
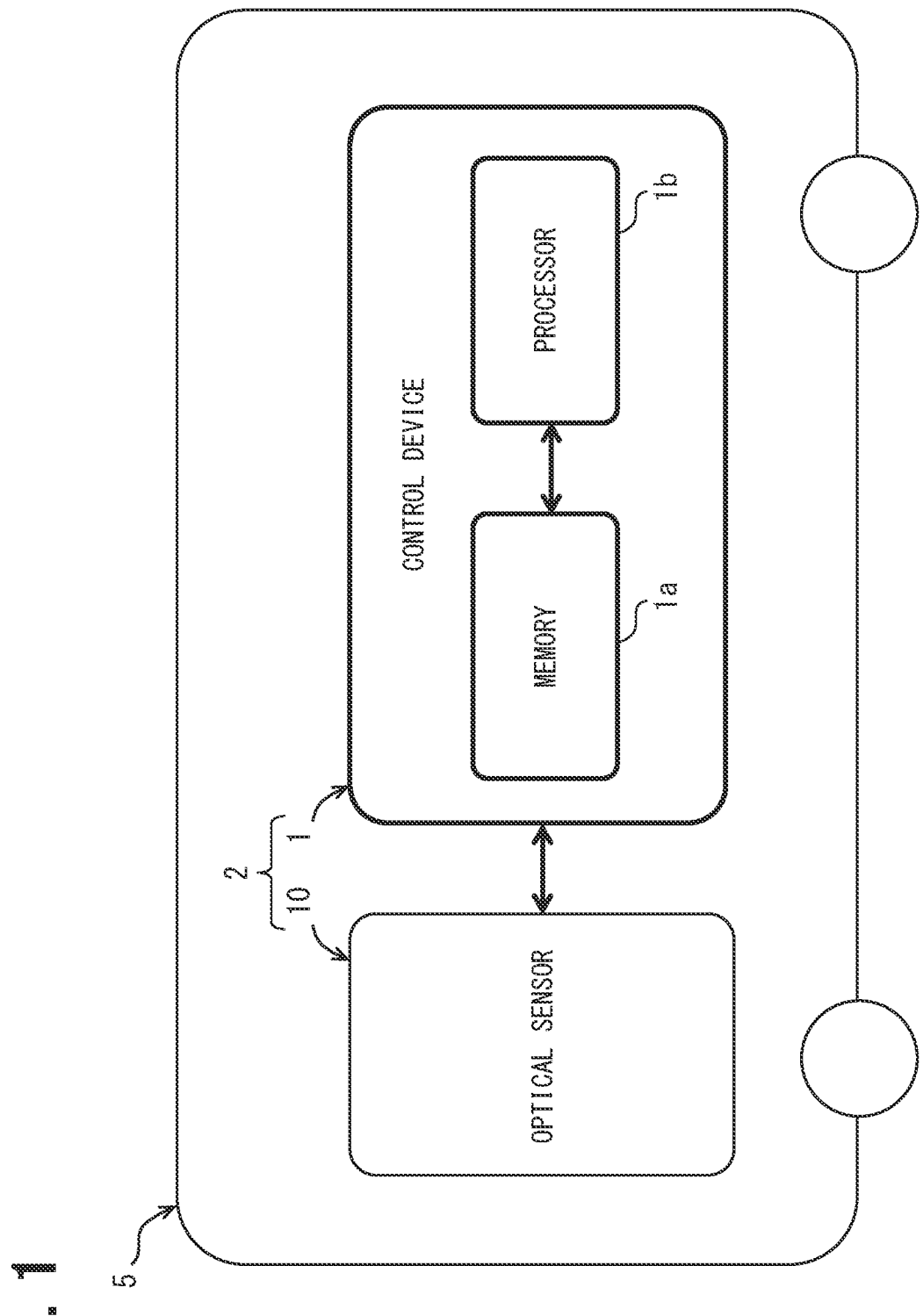
FIG. 1 is a schematic diagram showing a sensing system according to a first embodiment.

The number of responses of SPAD in the comparative example represents a reflection intensity from the target by the maximum value. Therefore, although it is possible to measure the reflection intensity according to the number of responses of the SPAD, the number of responses of the SPAD is affected by external light from the sensing area. Therefore, a decrease in measurement accuracy may occur.

One example of the present disclosure provides a control device that ensures measurement accuracy of an optical sensor. Another example of the present disclosure provides a control method that ensures the measurement accuracy of the optical sensor. Further, another example of the present disclosure provides a storage medium storing a control program for ensuring the measurement accuracy of the optical sensor.

According to a first example embodiment, a control device is used for controlling an optical sensor that includes a plurality of single photon avalanche diodes (SPADs) for each light reception pixel and receives light from a sensing area. The processor is configured to: acquire, for each light reception pixel, a light reception signal waveform including: a reflection light output component from the plurality of SPADs that have responded by receiving reflection light of irradiation light to the sensing area from the optical sensor; and an external light output component from the plurality of SPADs that have responded by receiving external light from the sensing area; and estimate, for each light reception pixel, a reflection intensity of the reflection light based on a correlation between a reflection light response number that is a response number of the plurality of SPADs that output the reflection light output component and an external light response number that is a response number of the SPADs that output the external light output component.

According to a second example embodiment of the present disclosure, a control method is executed by a processor for controlling an optical sensor that includes a plurality of single photon avalanche diodes (SPADs) for each light reception pixel and receives light from a sensing area. The method includes: acquiring, for each light reception pixel, a light reception signal waveform including: a reflection light output component from the plurality of SPADs that have responded by receiving reflection light of irradiation light to the sensing area from the optical sensor; and an external light output component from the plurality of SPADs that have responded by receiving external light from the sensing area; and estimating, for each light reception pixel, a reflection intensity of the reflection light based on a correlation between a reflection light response number that is a response number of the plurality of SPADs that output the reflection light output component and an external light response number that is a response number of the SPADs that output the external light output component.

According to a third example embodiment of the present disclosure, a non-transitory tangible storage medium stores a control program for controlling an optical sensor that includes a plurality of single photon avalanche diodes (SPADs) for each light reception pixel and receives light from a sensing area. The program stores program instructions that when executed by a processor cause the processor to at least: acquire, for each light reception pixel, a light reception signal waveform including: a reflection light output component from the plurality of SPADs that have responded by receiving reflection light of irradiation light to the sensing area from the optical sensor; and an external light output component from the plurality of SPADs that have responded by receiving external light from the sensing area; and estimate, for each light reception pixel, a reflection intensity of the reflection light based on a correlation between a reflection light response number that is a response number of the plurality of SPADs that output the reflection light output component and an external light response number that is a response number of the SPADs that output the external light output component.

In these first to third example embodiments, a light reception signal waveform is acquired for each light reception pixel, so as to include the reflection light output component from the SPAD that responded by receiving the reflection light of the irradiation light from the optical sensor to the sensing area, and the external light output component from the SPAD that responded by receiving external light from the sensing area. Therefore, according to the first to third example embodiments, the reflection intensity of the reflection light is accurately estimated in consideration of the reception light of the external light for each light reception pixel based on the correlation between the reflection light response number, which is the number of SPADs that have output the reflection light output component, and the external light response number, which is the number of SPADs that have output the external light output component. Therefore, it is possible to ensure the measurement accuracy of the reflection intensity through such estimation.

The following will describe embodiments of the present disclosure with reference to the drawings.

First Embodiment

As shown in FIG. 1, a first embodiment of the present disclosure relates to a sensing system 2 that includes an optical sensor 10 and a control device 1. The sensing system 2 is mounted on a vehicle 5 as a mobile object. The vehicle 5 is an automobile that can travel on a traveling path in a boarding state of an occupant.

The vehicle 5 is capable of executing a constant or temporary automated traveling in an automated driving control mode. Here, the automated driving control mode may be achieved with an autonomous operation control, such as conditional driving automation, advanced driving automation, or full driving automation, where the system in operation performs all driving tasks. The automated driving control mode may be achieved with an advanced driving assistance control, such as driving assistance or partial driving automation, where the occupant performs some or all driving tasks. The automated driving control mode may be achieved by any one, combination, or switching of autonomous driving control and advanced driving assistance control.

In the following description, unless otherwise specified, each direction of the front, the rear, the top, the bottom, the left, and the right is defined with respect to the vehicle 5 on a horizontal plane. Further, a horizontal direction refers to a parallel direction with respect to a horizontal plane that serves as a direction reference for the vehicle 5. Furthermore, a vertical direction refers to a direction perpendicular to a horizontal plane serving as a direction reference for the vehicle 5.

The optical sensor 10 is a so-called LiDAR (Light Detection and Ranging/Laser Imaging Detection and Ranging) for acquiring image data that can be used for driving control of the vehicle 5 including the automated control driving mode. The optical sensor 10 is disposed at at least one location in the vehicle 5, for example, among a front portion, a side portion on a left or a right, a rear portion, an upper roof, and the like.

Figure 2:
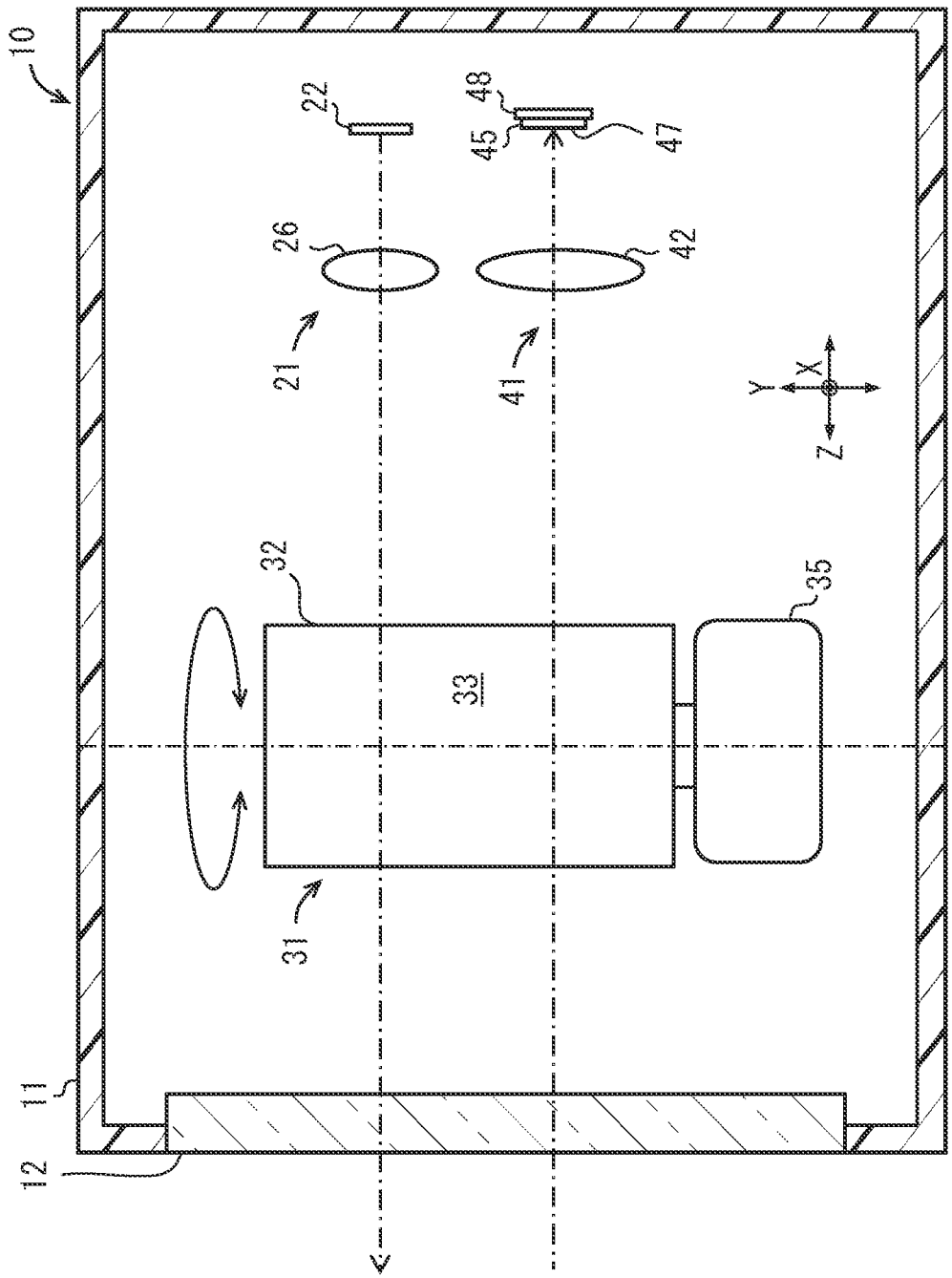
FIG. 2 is a schematic diagram showing a detailed configuration of an optical sensor according to the first embodiment.

As shown in FIG. 2, in the optical sensor 10, a three-dimensional orthogonal coordinate system is defined by three mutually orthogonal axes: an X-axis, a Y-axis, and a Z-axis. Particularly in the first embodiment, the X-axis and the Z-axis are set along different horizontal directions of the vehicle 5, and the Y-axis is set along the vertical direction of the vehicle 5. In addition, in FIG. 2, the left part with respect to the dashed-dot line along the Y axis (a part close to an optical window 12, which will be described later) is a cross section actually perpendicular to the right part with respect to the dashed-dotted line (a part close to unit 21, 41, which will be described later).

Figure 3:
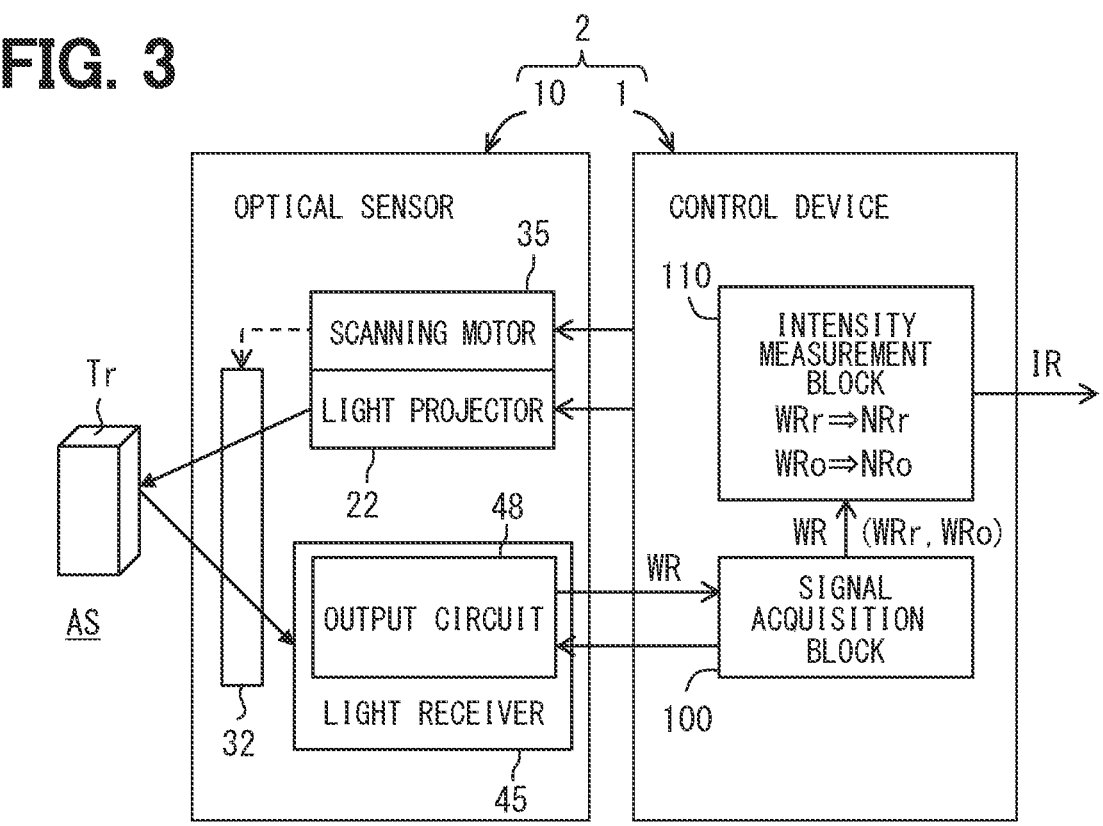
FIG. 3 is a block diagram showing a functional configuration of an optical sensor and a control device according to the first embodiment.

As shown in FIG. 3, the optical sensor 10 irradiates light toward a sensing area AS according to an arrangement and a viewing angle in the external space of the vehicle 5. The optical sensor 10 receives reflection light that is incident upon the irradiation light being reflected from the sensing area AS. The optical sensor 10 is also capable of receiving external light that enters from the sensing area AS when the irradiation of light to the sensing area AS is stopped. Hereinafter, when these reflection light and external light are collectively referred to as area light.

The optical sensor 10 senses the target Tr that is present in the sensing area AS and reflects light in response to such light reception. In particular, sensing in the first embodiment means measuring a reflection intensity IR, which is the intensity of reflection light reflected from the target Tr. A typical observation target to be observed by the optical sensor 10 applied to the vehicle 5 may be at least one type of mobile object such as a pedestrian, a cyclist, an animal other than a human, or another vehicle. The typical target to be observed by the optical sensor 10 applied to the vehicle 5 is at least one type of stationary object such as a guardrail, a road sign, a structure on a road side, or a fallen object on the road.

As shown in FIG. 2, the optical sensor 10 includes a housing 11, a light projection unit 21, a scanning unit 31, and a light reception unit 41. The housing 11 is formed in a box shape and has light blocking properties. The housing 11 accommodates the light projection unit 21, the scanning unit 31, and the light reception unit 41 therein. The housing 11 has the translucent optical window 12.

Figure 4:
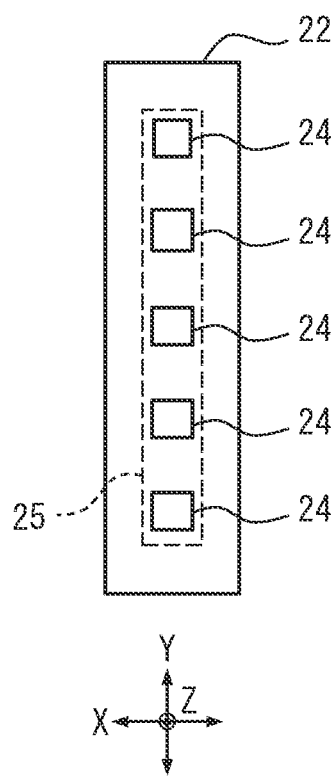
FIG. 4 is a schematic diagram of a light projector according to the first embodiment.

The light projection unit 21 includes a light projector 22 and a light projection lens 26. As shown in FIG. 4, the light projector 22 is formed by arranging a plurality of laser diodes 24 in an array on a substrate. Each laser diode 24 is arranged in a single row along the Y-axis. Each laser diode 24 has a resonator structure that can resonate light oscillated in a PN junction layer, and a mirror layer structure that can repeatedly reflect light with the PN junction layer in between. Each laser diode 24 pulses light in a near-infrared region that is difficult for humans to see in the external space of the vehicle 5 in accordance with a control signal from the control device 1. The external space includes the sensing area AS outside the optical sensor 10.

The light projector 22 has a light projection window 25 formed on one side of the substrate, the long side of which is pseudo-defined with a rectangular outline along the Y-axis. The light projection window 25 is configured as a collection of projection apertures in each laser diode 24. The light emitted from the projection aperture of each laser diode 24 is projected from the light projection window 25 in the sensing area AS as irradiation light of a longitudinal line along the Y-axis. The irradiation light may include a no-light-emission portion corresponding to the arrangement interval of each laser diode 24 in the Y-axis direction. Even in this case, it is preferable to form line-shaped irradiation light for which the no-light-emission portion is macroscopically eliminated in the sensing area AS due to a diffraction effect.

As shown in FIG. 2, the light projection lens 26 guides the irradiation light from the light projector 22 toward a scanning mirror 32 of the scanning unit 31. At least one light projection lens 26 is placed to provide at least one type of optical function among, for example, condensing, collimating, and shaping.

The scanning unit 31 includes the scanning mirror 32 and a scanning motor 35. The scanning mirror 32 is formed into a plate shape by vapor deposition of a reflective film on a reflective surface 33, which is one side of a base material. The scanning mirror 32 is supported by the housing 11 so as to be rotatable around (in other words, in a periphery of) a rotation center line along the Y-axis. The scanning mirror 32 swings within a driving range limited by a mechanical or electrical stopper. The scanning motor 35 rotates (in other words, swings) the scanning mirror 32 within a finite driving range according to a control signal from the control device 1. At this time, the rotation angle of the scanning mirror 32 changes sequentially in accordance with the irradiation period of the irradiation light, which substantially coincides with the pulse emission period of each laser diode 24.

The scanning mirror 32 reflects the irradiation light incident from the light projection lens 26 of the light projection unit 21 on the reflective surface 33 and projects the light onto the sensing area AS through the optical window 12, so that the sensing area AS is scanned by the scanning motor 35 according to the rotation angle. In particular, in the first embodiment, mechanical scanning of the sensing area AS by the irradiation light is substantially limited in the horizontal direction.

The scanning mirror 32 reflects area light (that is, reflection light and external light) that enters, according to the rotation angle by the scanning motor 35, from the sensing area AS through the optical window 12 toward the light reception unit 41 using the reflective surface 33. Here, the speed of the irradiation light and the reflection light are sufficiently large relative to the rotational speed of the scanning mirror 32. Thereby, the reflection light of the irradiation light is further reflected to the light reception lens 42 in a direction opposite to the irradiation light at the scanning mirror 32 having substantially the same rotation angle as the irradiation light.

The light reception unit 41 includes the light reception lens 42 and a light receiver 45. The light reception lens 42 is positioned below the light projection lens 26 in the Y-axis direction. The light reception lens 42 guides the area light incident from the scanning mirror 32 toward the light receiver 45. One or more light reception lenses 42 are provided to form an image of area light on the light receiver 45.

Figure 5:
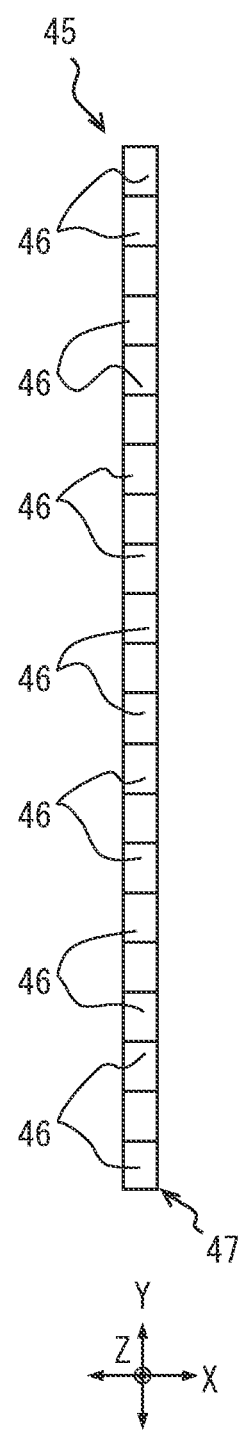
FIG. 5 is a schematic diagram of a light receiver according to the first embodiment.

The light receiver 45 is positioned below the projector 22 in the Y-axis direction. The light receiver 45 receives the area light from the sensing area AS imaged by the light reception lens 42, and outputs a light reception signal corresponding to the received light. Therefore, as shown in FIG. 5, the light receiver 45 has a light reception surface 47 with a rectangular outline formed on one side of the substrate. The light reception surface 47 is configured as a collection of incident surfaces of each light reception pixel 46 described later. Each light reception pixel 46 receives area light that has entered the light reception surface 47 from the light reception lens 42. Here, the long side of the light reception surface 47 forming a rectangular outline is defined along the Y-axis. As a result, among the area lights, the reflection light for the linear irradiation light in the sensing area AS is received as a linearly spread beam.

Figure 6:
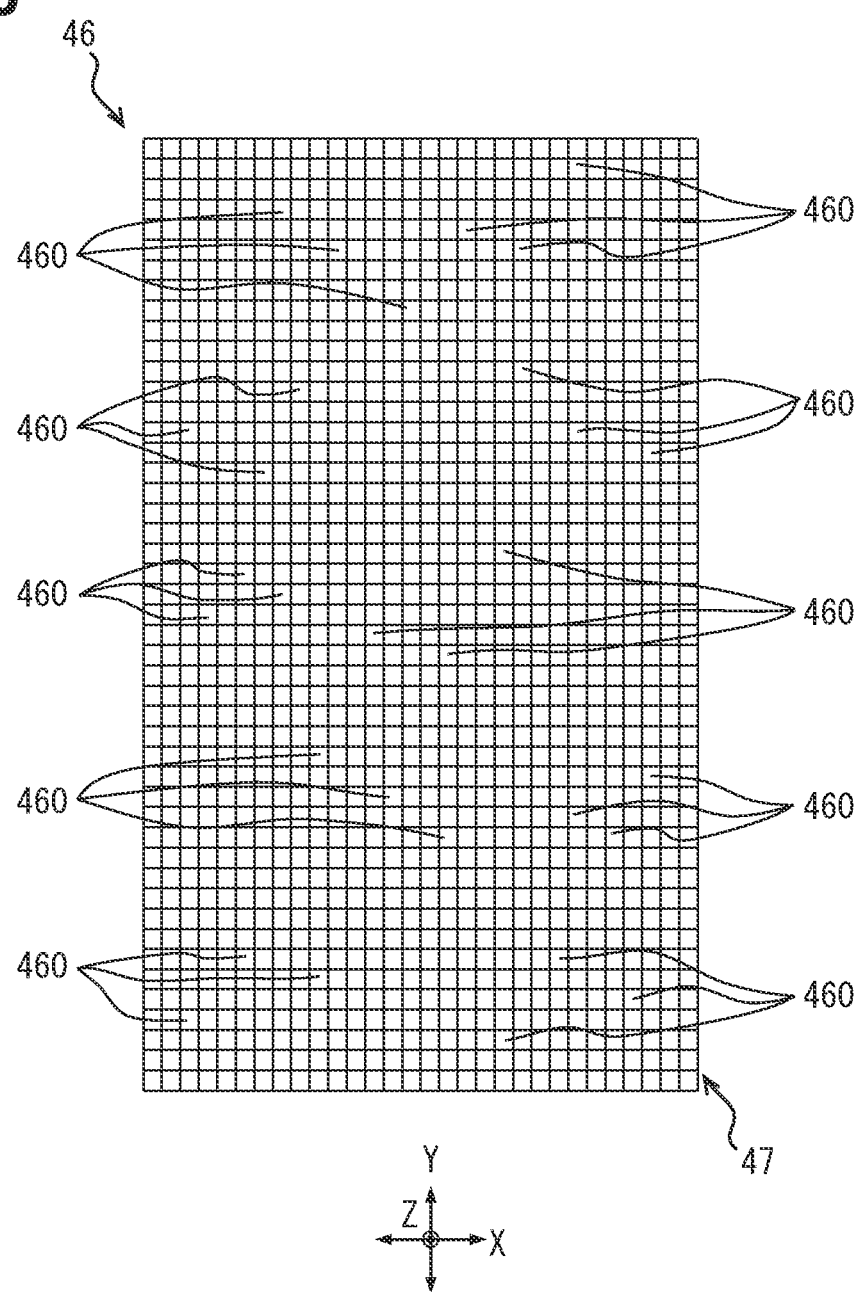
FIG. 6 is a schematic diagram of a light reception pixel according to the first embodiment.

As shown in FIG. 5, the light receiver 45 has a plurality of light reception pixels 46 arranged in a single row in the X-axis direction and in a one-dimensional array in the Y-axis direction. As shown in FIG. 6, each light reception pixel 46 includes a plurality of SPADs (Single Photon Avalanche Diodes) 460, each of which is a single photon avalanche diode. The SPADs 460 for each light reception pixel 46 are arranged in a two-dimensional array in the X-axis direction and the Y-axis direction, which is finer than each light reception pixel 46. In order to give priority to the visibility of the illustration, only some of the light reception pixels 46 are labeled with symbols in FIG. 5, and only some of the SPADs 460 are labeled with symbols in FIG. 6.

Figure 7:
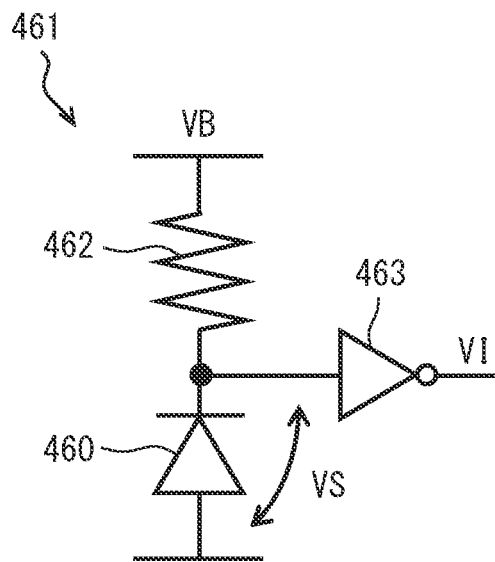
FIG. 7 is a schematic diagram of a light reception circuit according to the first embodiment.

The SPAD 460 of each light reception pixel 46 outputs a pulse signal in response to the received area light. Therefore, as shown in FIG. 7, each light reception pixel 46 has a light reception circuit 461 for outputting a pulse signal for each SPAD 460. Specifically, in the light reception circuit 461, a reverse bias voltage VB is applied to the cathode of the SPAD 460 via a quench resistor 462. Further, in the light reception circuit 461, an inverter 463 that outputs a pulse signal with a voltage amplitude VI is connected to a connection midpoint between the SPAD 460 and the quench resistor 462.

Figure 8:
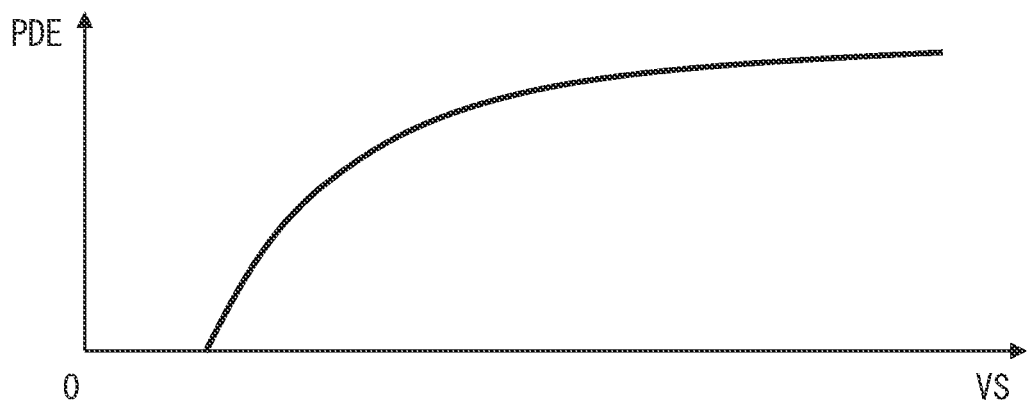
FIG. 8 is a schematic diagram of characteristics of the light reception circuit according to the first embodiment.
Figure 9:
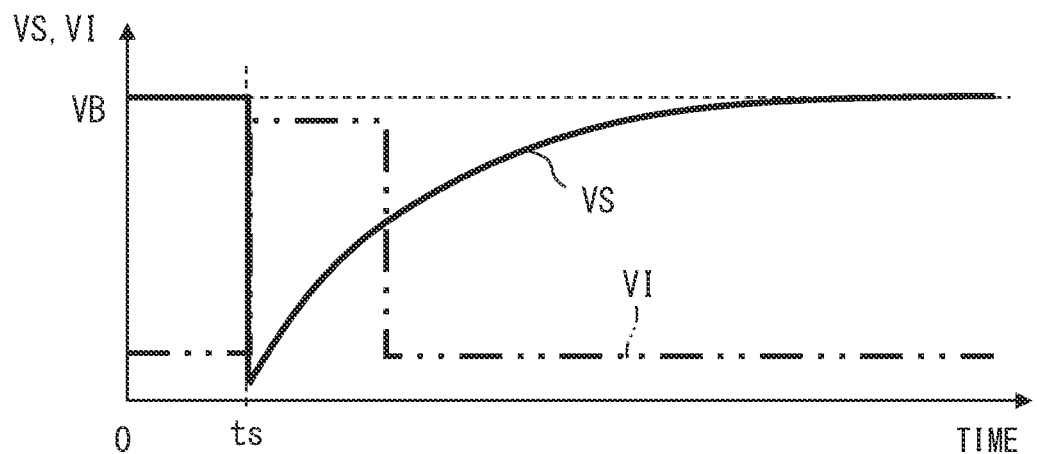
FIG. 9 is a schematic diagram of the characteristics of the light reception circuit according to the first embodiment.

When the area light is input to the SPAD 460 in such a light reception circuit 461, a response of the SPAD 460 occurs at a timing ts shown in FIG. 9 with a response probability PDE depending on a voltage VS across the SPAD 460 as shown in FIG. 8. As a result, a pulse signal with voltage amplitude VI is output. At this time, the voltage VS momentarily drops in response to the response of the SPAD 460, and then is recharged so as to gradually recover toward the reverse bias voltage VB. Therefore, when the SPAD 460 responds due to external light among the area light regardless of reflection light, the average value of the voltage VS within a unit time decreases due to the recovery process of the voltage VS, and the response probability PDE also decreases. Here, when the intensity of external light is particularly strong, the recharge time per unit time increases, and the response probability PDE of the SPAD 460, that is, the response sensitivity decreases. For this reason, in an environment where external light is received, the correlation between the number of responses of the SPAD 460 to reflection light and the reflection intensity IR of the reflection light changes depending on the intensity of the external light. Therefore, it is difficult to obtain accuracy simply by correcting the reflection intensity IR based on a simple ratio of the number of responses to reflection light of the SPAD 460 and the number of responses of the same SPAD 460 to external light.

As shown in FIGS. 2 and 3, the light receiver 45 has an output circuit 48. The output circuit 48 executes a sampling process at each sampling period according to the control signal from the control device 1 in a measurement frame FM shown in FIG. 10, for each scanning line correspondingly associated with the rotation angle of the scanning mirror 32 according to the irradiation period of the irradiation light. At this time, the output circuit 48 synthesizes the pulse signals from the SPAD 460 in response to the unit time that is the sampling period. As a result, a light reception signal is generated for each light reception pixel 46 so that the number of responses of the SPAD 460 per unit time is expressed by the amplitude. The light reception signal generated in this way for each light reception pixel 46 is output from the output circuit 48 to the control device 1 for each scanning line.

Figure 10:
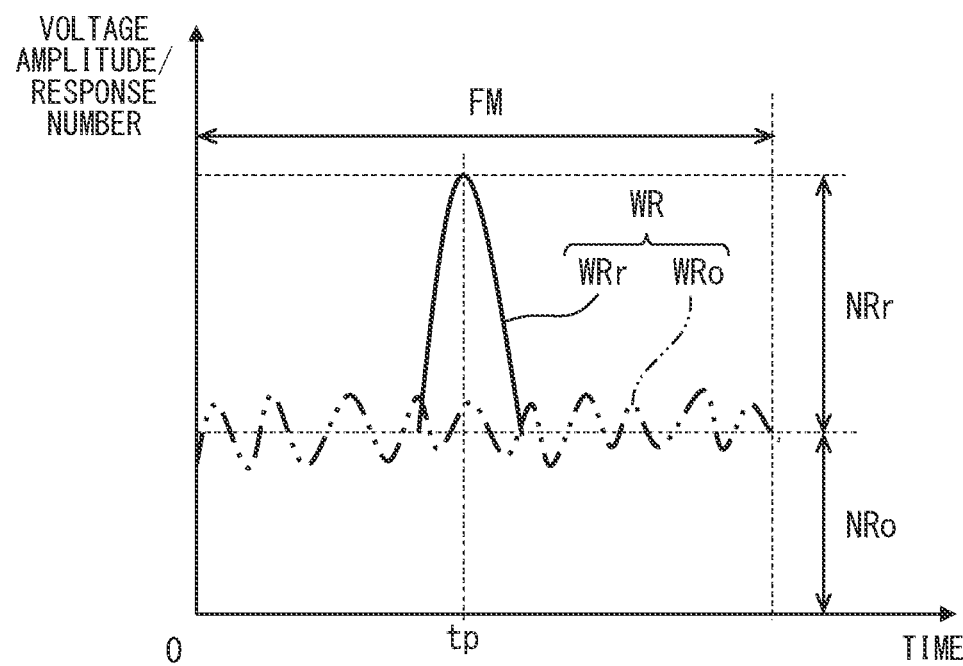
FIG. 10 is a graph showing a light reception signal waveform according to the first embodiment.

As shown in FIG. 10, at the timing when only the external light is received among the area light, only an external light output component WRo representing the number of responses of the SPAD 460 to the external light appears in an amplitude waveform WR of the light reception signal. On the other hand, at the timing when the reflection light of the irradiation light is received together with the external light, a reflection light output component WRr representing the number of responses of the SPAD 460 to the reflection light is superimposed on the external light output component WRo, and appears in the amplitude waveform of the reception light signal WR. Here, the amplitude waveform WR of the light reception signal means the time transition of the voltage amplitude per unit time regarding the light reception signal in the measurement frame FM, and is particularly defined as the light reception signal waveform WR in the first embodiment.

The control device 1 shown in FIG. 1 is connected to the optical sensor 10 via at least one of, for example, a LAN (Local Area Network), a wire harness, and an internal bus. The control device 1 includes at least one dedicated computer. The dedicated computer constituting the control device 1 may be a sensor ECU (Electronic Control Unit) specialized for controlling the optical sensor 10. In this case, the sensor ECU may be housed in the housing 11. The dedicated computer constituting the control device 1 may be a driving control ECU that controls the driving of the vehicle 5. The dedicated computer constituting the control device 1 may be a navigation ECU that navigates a travel route of the vehicle 5. The dedicated computer constituting the control device 1 may be a locator ECU that estimates a self-state quantity of the vehicle 5.

The dedicated computer constituting the control device 1 has at least one memory 1a and at least one processor 1b. The memory 1a is at least one type of non-transitory tangible storage medium out of, for example, a semiconductor memory, a magnetic medium, an optical medium, and the like that non-transitorily store a computer readable program, data, and the like. For example, the processor 1b may include, as a core, at least one of a central processing unit (CPU), a graphics processing unit (GPU), a reduced instruction set computer (RISC) CPU, a data flow processor (DFP), a graph streaming processor (GSP), or the like.

The processor 1b executes multiple instructions included in a control program stored in the memory 1a. Thereby, the control device 1 constructs a plurality of functional blocks for controlling the optical sensor 10. In this manner, in the control device 1, the control program stored in the memory 1a for controlling the optical sensor 10 causes the processor 1b to execute a plurality of instructions, thereby constructing a plurality of functional blocks. The plurality of functional blocks constructed by the control device 1 include a signal acquisition block 100 and an intensity measurement block 110, as shown in FIG. 3.

Figures 11, 12:
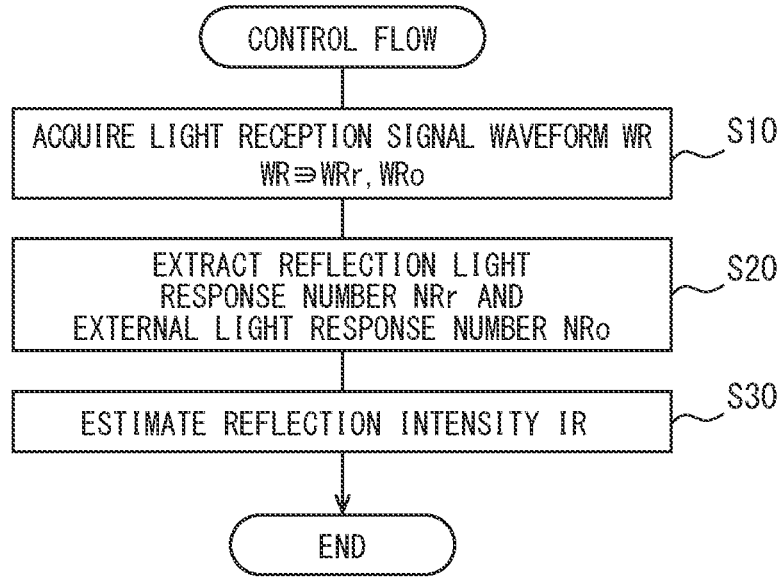
FIG. 11 is a flowchart showing a control flow according to the first embodiment.
FIG. 12 is a diagram showing a correlation table according to the first embodiment.

The control method in which the control device 1 controls the optical sensor 10 by the cooperation of the blocks 100 and 110 is executed according to the control flow shown in FIG. 11. This control flow is repeatedly executed for each scanning line and each measurement frame FM while the vehicle 5 is being activated. Each "S" in the control flow indicates one or more processes executed by one or more instructions included in the control program.

In S10 of the control flow, the signal acquisition block 100 acquires the light reception signal waveform WR for each light reception pixel 46 from the output circuit 48 of the light receiver 45 by giving a control signal to the light receiver 45 in the current measurement frame FM (see FIG. 3). At this time, the light reception signal waveform WR acquired for each light reception pixel 46 includes the reflection light output component WRr from the SPAD 460 that responded by receiving reflection light of the irradiation light, and an external light output component WRo from the SPAD 460 that responded by receiving external light, as shown in FIG. 10.

As shown in FIG. 11, the control flow moves to S20 after the execution of S10 is completed. In S20, the intensity measurement block 110 extracts a reflection light response number NRr, which is the number of SPADs 460 that have output the reflection light output component WRr, and an external light response number NRo, which is the number of SPADs 460 that have outputted the external light output component WRo from the light reception signal waveform WR for each light reception pixel 46 (see FIG. 3). At this time, the intensity measurement block 110 separates the external light output component WRo from the reflection light output component WRr as a base component. For example, by using a waveform processing algorithm or the like, the intensity measurement block 110 demultiplexes the output components WRr and WRo as shown by a solid line and a long dashed double-dotted line of FIG. 10. Further, the intensity measurement block 110 extracts the reflection light response number NRr corresponding to the voltage amplitude at a peak timing tp in FIG. 10 from the demultiplexed reflection light output component WRr. Together with this, the intensity measurement block 110 extracts the external light response number NRo corresponding to the average voltage amplitude of the demultiplexed external light output component WRo.

Figure 13:
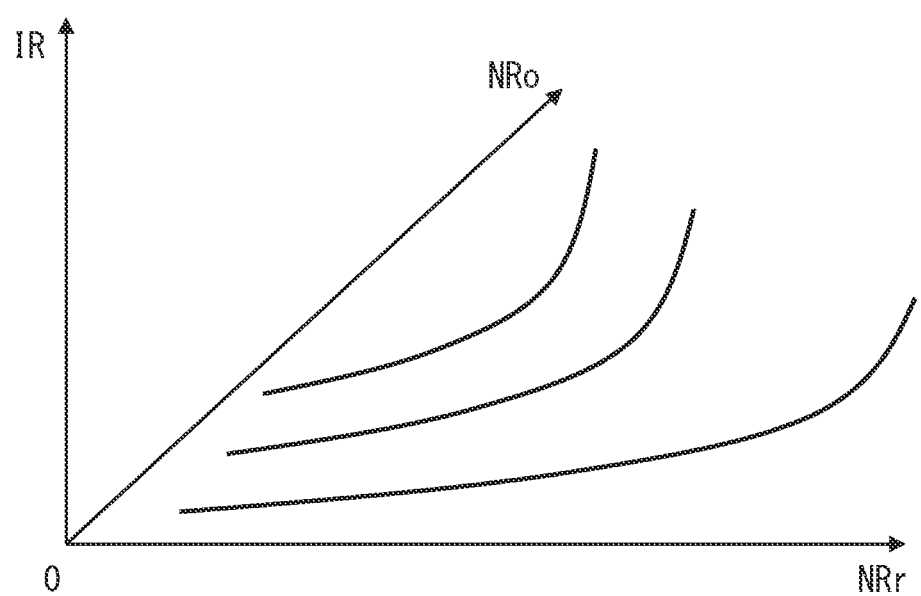
FIG. 13 is a diagram showing a correlation table according to the first embodiment.

As shown in FIG. 11, the control flow moves to S30 after the execution of S20 is completed. In S30, the intensity measurement block 110 estimates the reflection intensity IR of the received reflection light in the measurement frame FM for each light reception pixel 46 based on the correlation between the extracted reflection light response number NRr and the external light response number NRo (see FIG. 3). At this time, the intensity measurement block 110 may estimate the reflection intensity IR corresponding to the correlation pair of the reflection light response number NRr and the external light response number NRo based on a matrix correlation table assumed and stored in advance in the memory 1a as shown in FIG. 12. The intensity measurement block 110 may estimate the reflection intensity IR corresponding to the reflection light response number NRr and the external light response number NRo based on a three-dimensional correlation map and a correlation function equation assumed and stored in advance in the memory 1a as shown in FIG. 13 and a first equation. Note that in the first equation, a1, a2, and a3 are coefficient parameters that are preset based on, for example, regression analysis or empirical rules.

$$IR = a1 \cdot NRr + a2 \cdot NRo + a3 \cdot NRr \cdot NRo \quad \text{(First Equation)}$$

As shown in FIG. 11, in the control flow, in S30, the estimation of the measurement of the reflection intensity IR regarding target Tr for each light reception pixel 46 constituting the scanning line corresponding to the current measurement frame FM is completed, and the current execution ends. The reflection intensity IR of each light reception pixel 46, which is to be measured for each measurement frame FM of each scanning line, is combined and output as intensity image data for all scanning lines, so that the reflection intensity IR is used for driving control including automated driving control mode of the vehicle 5.

(Operation Effects)

The operation effects of the first embodiment described so far will be described below.

In the first embodiment, the light reception signal waveform WR is acquired for each light reception pixel 46 so as to include the reflection light output component WRr from the SPAD 460 that responded by receiving the reflection light of the irradiation light from the optical sensor 10 to the sensing area AS, and the external light output component WRo from the SPAD that responded by receiving external light from the sensing area. Therefore, according to the first embodiment, the reflection intensity IR of the reflection light is accurately estimated in consideration of the reception light of the external light for each light reception pixel 46 based on the correlation between the reflection light response number NRr, which is the number of SPADs 460 that have output the reflection light output component WRr, and the external light response number NRo, which is the number of SPADs 460 that have output the external light output component WRo. Therefore, it is possible to ensure the measurement accuracy of the reflection intensity IR through such estimation.

In the first embodiment, the reflection light response number NRr and the external light response number NRo are extracted from the reflection light output component WRr and the external light output component WRo, which are demultiplexed from the light reception signal waveform WR, respectively. According to this, it is possible to accurately estimate the reflection intensity IR in consideration of the influence of external light reception based on the correlation between the reflection light response number NRr and the external light response number NRo, which can be extracted individually by wave separation. Therefore, it is possible to improve the measurement accuracy of the reflection intensity IR through such estimation.

Second Embodiment

A second embodiment is a modification of the first embodiment.

Figure 14:
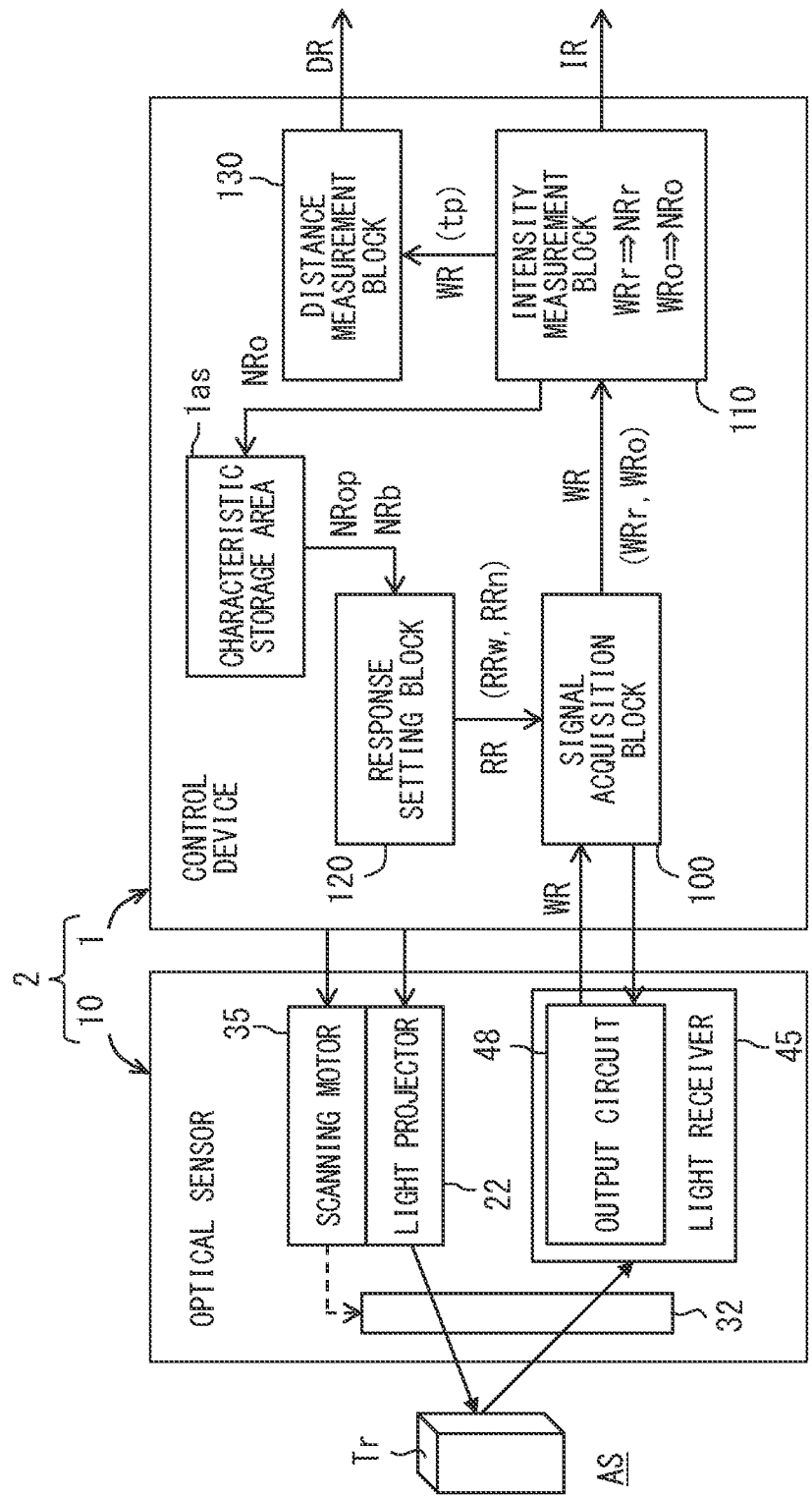
FIG. 14 is a block diagram showing a functional configuration of an optical sensor and a control device according to a second embodiment.
Figure 15:
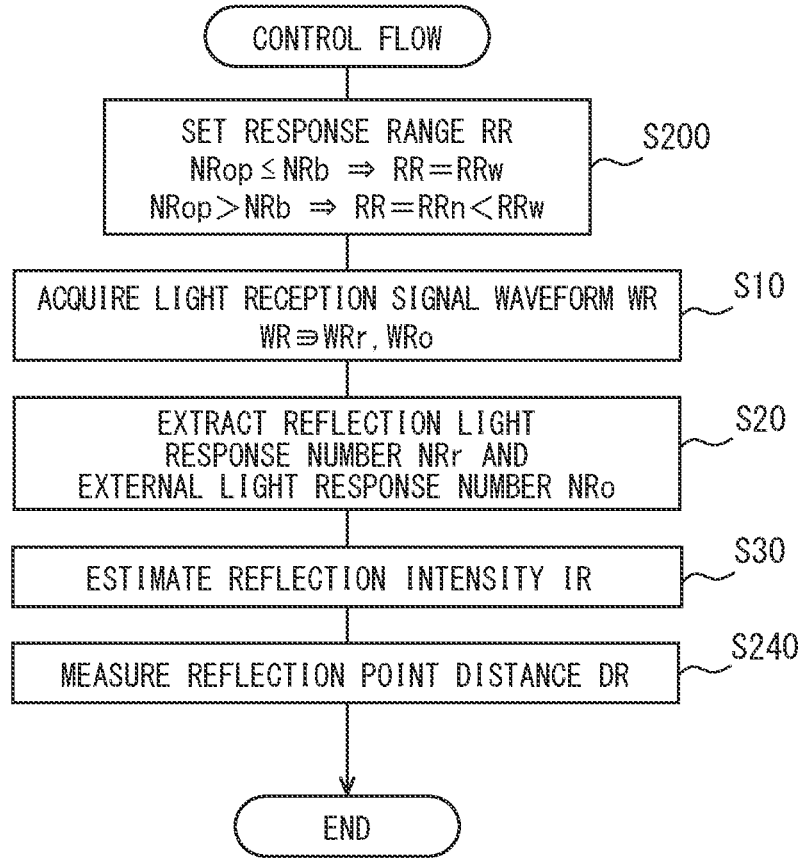
FIG. 15 is a flowchart showing a control flow according to the second embodiment.

In the second embodiment shown in FIG. 14, sensing means measuring a reflection point distance DR that is the distance from the optical sensor 10 to the target Tr, which is the reflection point of the reflection light, in addition to the reflection intensity IR of the reflection light reflected from the target Tr. Therefore, in addition to the signal acquisition block 100 and the intensity measurement block 110, a response setting block 120 and a distance measurement block 130 are added to the plurality of functional blocks constructed in the second embodiment. Accordingly, as shown in FIG. 15, a control flow of the second embodiment executes S200 before executing S10 to S30 and S240.

$$IR = a1 \cdot NRr + a2 \cdot NRo + a3 \cdot NRr \cdot NRo + a4 \cdot \tau \quad \text{(Second Equation)}$$

In S200, the response setting block 120 sets a response range RR, which is an array range of SPADs 460 that permit a response, for each light reception pixel 46 according to the intensity of external light (see FIG. 14). At this time, the response setting block 120 reads, from a characteristic storage area 1 as of the memory, the external light response number NRo extracted in S20 of the past measurement frame FM according to the past control flow to the same scanning line as the current measurement frame FM according to the current control flow, as a past response number NRop corresponding to the external light output component WRo included in the past acquisition light reception signal waveform WR. The response setting block 120 further compares the read past response number NRop with a determination criterion NRb.

In particular, in the second embodiment, a time lag between the current measurement frame FM corresponding to the scanning line of the current control flow and the past measurement frame FM corresponding to the scanning line of the past control flow is very short. Therefore, assuming that the change in external light intensity between the current measurement frame FM and the past measurement frame FM is minute, in S200, the external light intensity in the current measurement frame FM is determined by comparing the past response number NRop with the determination criterion NRb. Here, the determination criterion NRb is set in advance to determine the boundary between the external light intensity for which it is necessary to prioritize the measurement of the reflection intensity IR and the external light intensity for which it is necessary to prioritize the measurement of the reflection point distance DR. The determination criterion NRb is stored in the characteristic storage area 1as. Thereby, it is read out together with the past response number NRop in S200.

Figure 16:
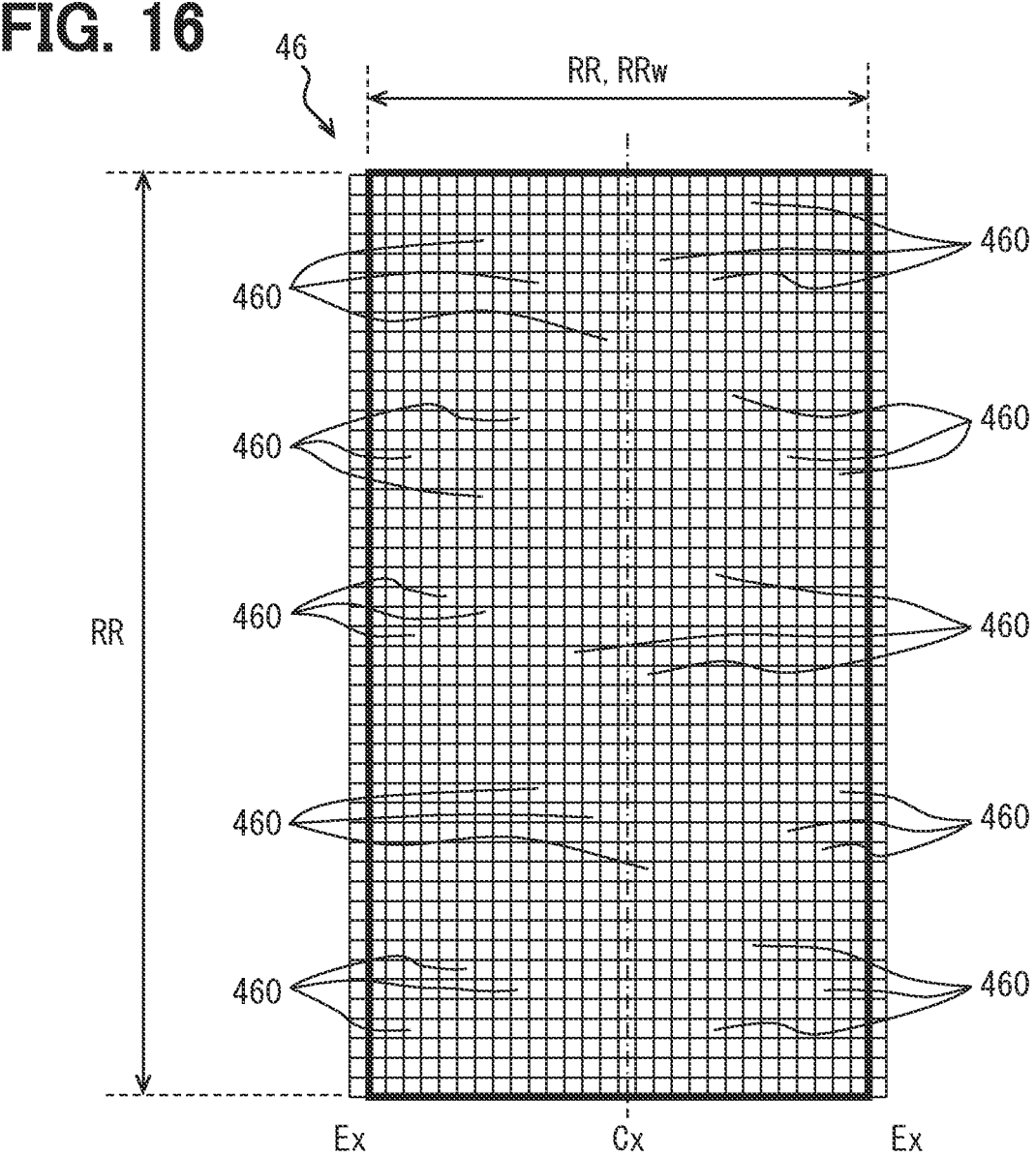
FIG. 16 is a schematic diagram of a response range of a light reception pixel according to the second embodiment.
Figure 17:
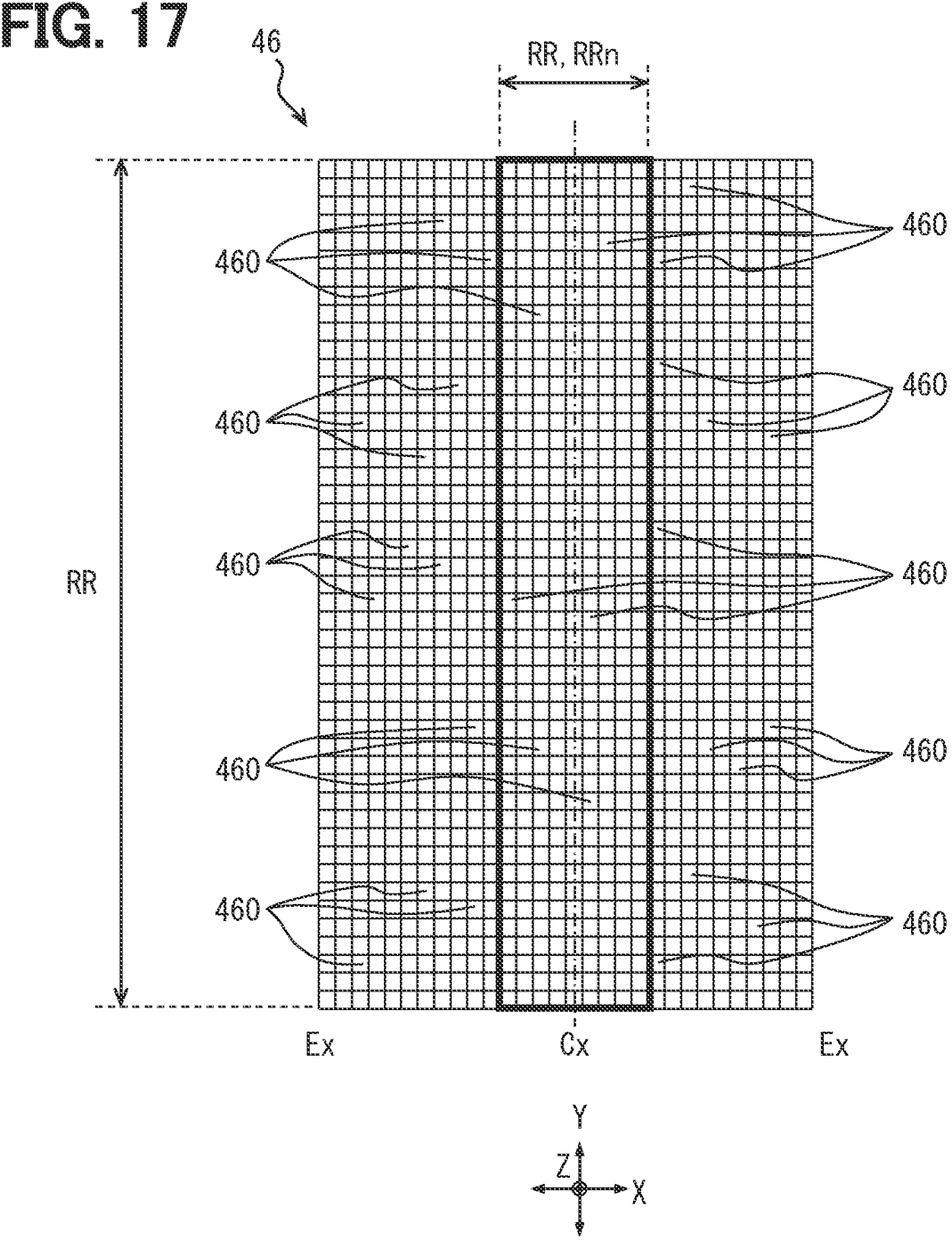
FIG. 17 is a schematic diagram of the response range of the light reception pixel according to the second embodiment.
Figure 18:
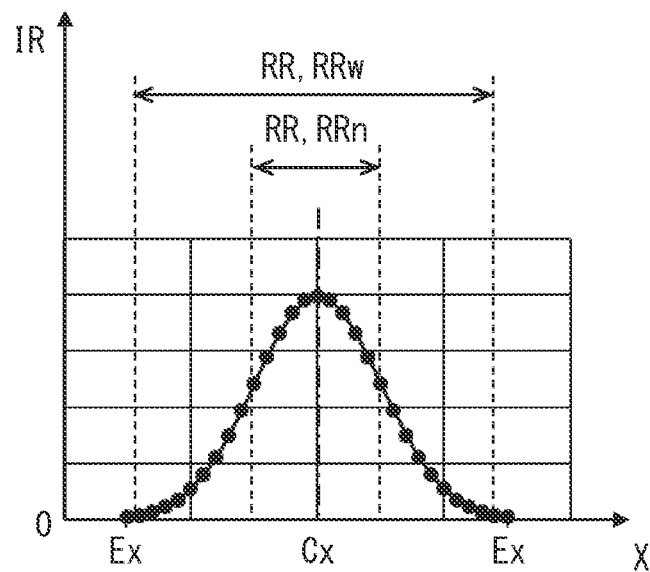
FIG. 18 is a graph of the response range of the light reception pixel according to the second embodiment.

As a result of the comparison, when the past response number NRop exceeds the criterion NRb, the response setting block 120 in S200 sets the response range RR of the SPAD 460 to a range narrower than in a case where so that the past response number NRop is less than or equal to the determination criterion NRb, as shown in FIGS. 15 to 19. At this time, in the second embodiment in which the scanning by the irradiation light is substantially limited to mechanical scanning in the horizontal direction as in the first embodiment, the response range RR is adjusted in the X-axis direction corresponding to the horizontal direction. Such adjustment of the response range RR in the X-axis direction is based on a phenomenon that the reflection intensity IR of the reflection light received due to the scanning in the horizontal direction by the vertical liner irradiation light is distributed for each row of SPADs 460 along the Y-axis direction, such that it decreases from the position Cx toward both ends Ex as shown in FIG. 18. Together with this, in the Y-axis direction corresponding to the vertical direction in the second embodiment, the response range RR is fixed as shown in FIGS. 16 and 17, regardless of the magnitude relationship between the past response number NRop and the determination criterion NRb. The fixation of the response range RR in the Y-axis direction is based on a phenomenon that the distribution of the reflection intensity IR of the reflection light received due to the scanning in the horizontal direction with the liner irradiation light, which is long in the vertical direction, is suppressed for each row of SPADs 460 along the Y-axis direction.

Figure 19:
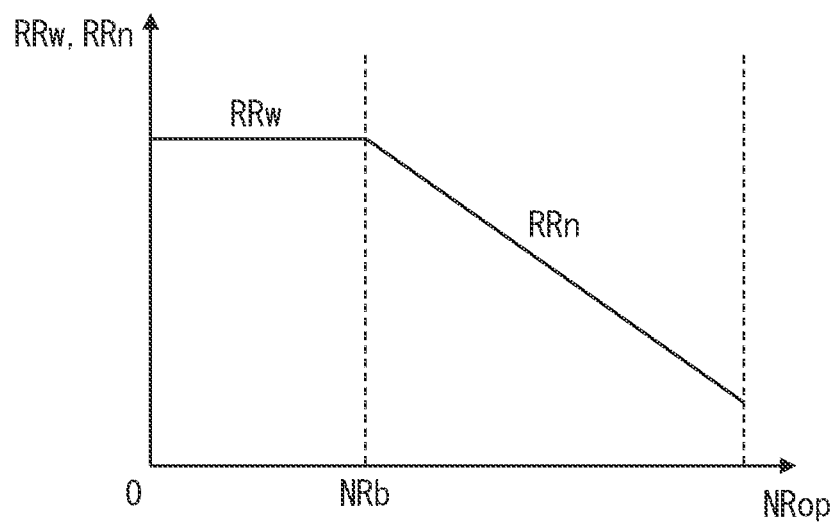
FIG. 19 is a graph of the response range of the light reception pixel according to the second embodiment.

Here, particularly in the second embodiment, two types of ranges RRw and RRn, which are different in width, are assumed as the response range RR in the X-axis direction, as shown in FIGS. 16 to 19. Specifically, as shown in FIG. 19, the wider response range RRw, which is the response range RR when the past response number NRop is equal to or less than the determination criterion NRb, is fixed to a range that is wide as much as possible and does not extend from the center position Cx in the X-axis direction to both ends of each light reception pixel 46, regardless of the change in the past response number NRop, as shown in FIGS. 16 and 18.

On the other hand, as shown in FIG. 19, the narrower response range RRn, which is the response range RR when the past response number NRop exceeds the determination criterion NRb, is changeably set to a range that extends from the center position Cx in the X-axis direction to the both ends Ex as shown in FIGS. 17 and 18 for each light reception pixel 46, and is narrower than the wider response range RR. At this time, the variable setting of the narrower response range RRn is performed such that the response range RR becomes narrower as the past response number NRop increases. Here, in the X-axis direction, the center position Cx of each light reception pixel 46 that determines the origin position of each response range RRw, RRn ideally corresponds to the peak light reception position at which the reflection intensity IR of the reflection light received by each light reception pixel 46 becomes the maximum intensity, as shown in FIG. 18.

In S10 of FIG. 15, which follows S200, the light reception signal waveform WR acquired in the current measurement frame FM includes the reflection light output component WRr and the external light output component WRo output from the SPAD 460 within the response range RR. Accordingly, in S20 following S200, the reflection light response number NRr and the external light response number NRo within the response range RR are extracted, and in S30 that further follows S200, the reflection intensity IR is measured by estimation based on the response number NRr and the response number NRo within the response range RR In particular, in S20 subsequent to S200, at least the external light response number NRo of the extraction results is accumulated in the characteristic storage area 1 as.

Furthermore, as a process subsequent to S200, the control flow of the second embodiment executes S240 after S30. In S240, the distance measurement block 130 measures the reflection point distance DR of the reflection light based on the light reception signal waveform WR acquired in S10 (see FIG. 14). At this time, in the second embodiment, the reflection point distance DR is obtained by dTOF (direct time of flight) based on the time difference between a peak timing tp of the reflection light output component WRr recognized from the light reception signal waveform WR in S20 (see FIG. 10 of the first embodiment) and the irradiation start timing that is a start timing of the irradiation period of the irradiation light in the current measurement frame FM.

As shown in FIG. 15, in the control flow, in S240, the measurement of the reflection point distance DR for each light reception pixel 46 constituting the scanning line corresponding to the current measurement frame FM is completed, and the current execution ends. The reflection intensity IR of each light reception pixel 46, which is to be measured for each measurement frame FM of each scanning line, is combined and output as distance image data for all scanning lines, so that the reflection point distance DR is used for driving control including automated driving control mode of the vehicle 5. Further, also in the second embodiment similar to the first embodiment, the reflection intensity IR of each light reception pixel 46, which is to be measured for each measurement frame FM of each scanning line, is combined and output as intensity image data for all scanning lines, so that the reflection intensity IR is used for driving control including automated driving control mode of the vehicle 5. Furthermore, along with the output of these distance image data and intensity image data, the setting result of the response range RR may also be output.

(Operation Effects)

Operation effects specific to the second embodiment described so far will be described.

According to the second embodiment, before acquiring the light reception signal waveform WR, the response range RR, which is the arrangement range of the SPAD 460 that permits response, is set for each light reception pixel 46 according to the intensity of external light. According to this, between the estimation of the reflection intensity IR based on the correlation of each output component WRr and WRo included in the light reception signal waveform WR and the measurement of the reflection point distance DR based on the light reception signal waveform WR, it is possible to adapt the response range RR for each light reception pixel 46 to the one according to the external light intensity. Therefore, it is possible to appropriately select the measurement that, in consideration of the external light intensity, prioritizes accuracy between the measurement of the estimated reflection intensity IR and the measurement of the reflection point distance DR.

According to the second embodiment, prior to the current acquisition of the light reception signal waveform WR, the response range RR (RRn) in the case where the past response number NRop exceeds the determination criterion NRb is set to be narrower than the response range RR (RRw) in the case where the past response number NRop is equal to or less than the determination criterion NRb, the past response number NRop being the external light response number NRo corresponding to the external light output component WRo in the past acquisition light reception signal waveform WR. According to this, in a situation where the past response number NRop is increasing due to the high external light intensity, it is possible to prioritize the measurement accuracy of the reflection point distance DR by the narrow response range RR (RRn). On the other hand, in a situation where the past response number NRop is decreasing due to the low external light intensity, it is possible to prioritize the measurement accuracy of the reflection intensity IR by the wide response range RR (RRw). Therefore, along with the output of the distance image data and intensity image data described above, the type of data that prioritizes accuracy may also be output instead of or in addition to the setting result of the response range RR.

According to the second embodiment, the response range RR (RRn) is set to be narrower as the past response number NRop increases in the case of exceeding the determination criterion NRb. According to this, in the situation where the past response number NRop is increasing, the response range RR (RRn), which becomes narrower as the external light intensity increases, prevents the influence of measurement errors caused by external light reception noise on the reflection point distance DR. Therefore, it becomes possible to improve the measurement accuracy of the reflection point distance DR.

Third Embodiment

A third embodiment is a modification of the second embodiment.

Figure 20:
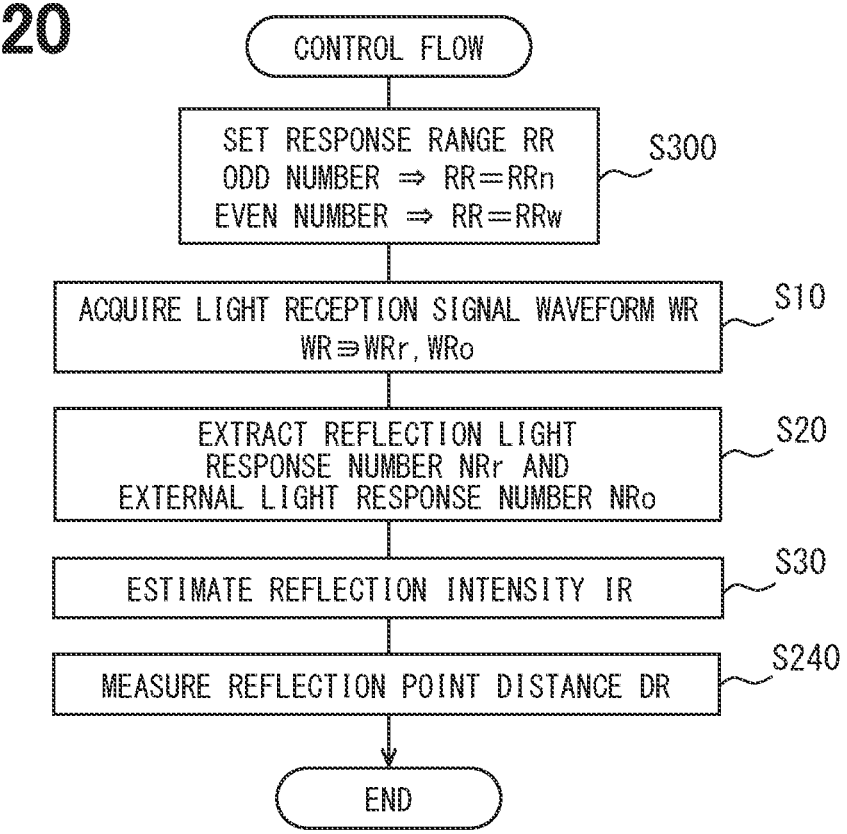
FIG. 20 is a flowchart showing a control flow according to a third embodiment.
Figure 21:
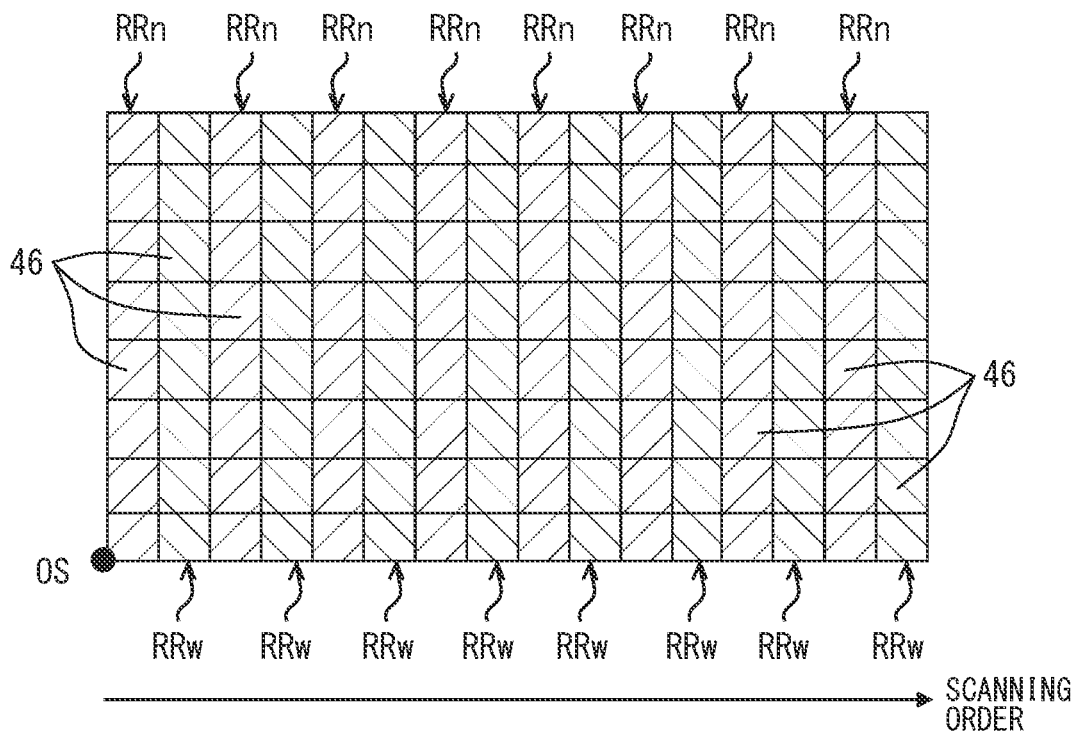
FIG. 21 is a schematic diagram for illustrating a setting of a response range of a light reception pixel according to a third embodiment.

As shown in FIG. 20, the control flow of the third embodiment executes S300 instead of S200. In S300, as shown in FIG. 21, the response setting block 120 sets one of the wide and narrow ranges RRw and RRn as the response range RR of the SPAD 460 for which a response is permitted for each scanning line corresponding to the current measurement frame FM. Note that, in order to give priority to the visibility of the illustration, in FIG. 21, only some of the light reception pixels 46 constituting each scanning line are labeled.

Figure 22:
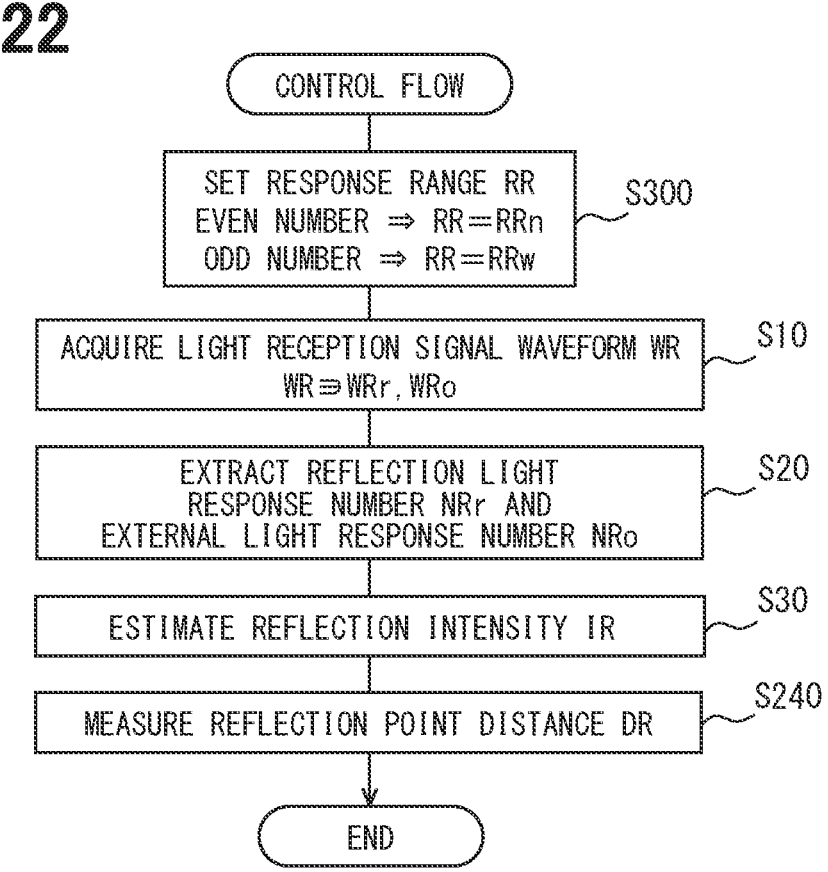
FIG. 22 is a flowchart showing a modification of the control flow of FIG. 20.

At this time, as shown in FIGS. 20 and 21, in the second embodiment, the narrow response range RRn is set in the measurement frame FM of the scanning line whose scan order from a scanning origin OS is an odd number. On the other hand, the wide response range RRw is set in the measurement frame FM whose scan order from the scanning origin OS is an even number. Here, as shown in FIG. 22, the narrow response range RRn may be set in the measurement frame FM of the scanning line whose scan order from the scanning origin OS is the even number. On the other hand, the wide response range RRw may be set in the measurement frame FM whose scan order from the scanning origin OS is the odd number. In any of these cases, each of the intensity image data and distance image data for all scanning lines becomes data in which a scanning line, in which the measurements of the reflection intensity IR and the reflection point distance DR are executed in the narrow response range RRn, and a scanning line, in which the measurements are executed in the wide response range RRw, are alternately arranged (see FIG. 21).

(Operation Effects)

Operation effects specific to the third embodiment described so far will be described.

According to the third embodiment, prior to acquiring the light reception signal waveform WR, different wide and narrow ranges RRw and RRn are set for each scanning line of the light reception pixel 46 as the response range RR of the SPAD 460 that permits a response. According to this, it is possible to adapt the scanning line of the wide response range RRw to estimate the reflection intensity IR based on the correlation between the output components WRr and WRo included in the light reception signal waveform WR. On the other hand, it is possible to adapt the scanning line of the narrow response range RRn to measure the reflection point distance DR based on the reception signal waveform WR. Therefore, it is possible to ensure a good balance between the measurement accuracy of the reflection intensity IR and the measurement accuracy of the reflection point distance DR by the estimation for each scanning line.

Fourth Embodiment

A fourth embodiment is a modification of the second embodiment.

Figure 23:
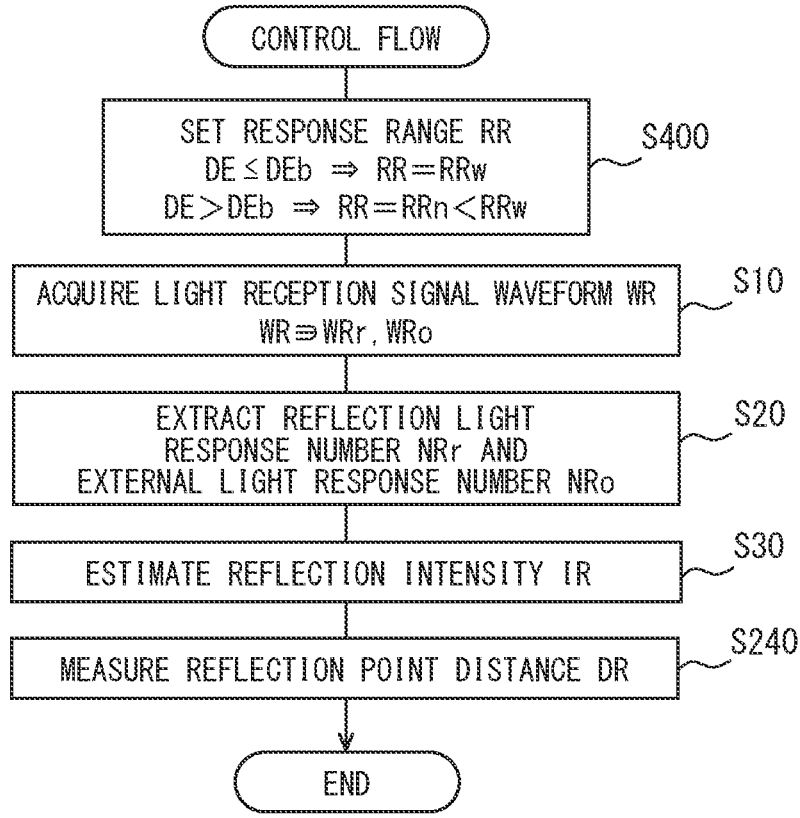
FIG. 23 is a flowchart showing a control flow according to a fourth embodiment.

As shown in FIG. 23, the control flow of the fourth embodiment executes S400 instead of S200. In S400, for each light reception pixel 46 of the scanning line corresponding the current measurement frame FM, the response setting block 120 sets, as the response range RR of the SPAD 460 that permits the response, one corresponding to the comparison of an estimation distance DE with a reference distance DEb between the wide and narrow ranges RRw and RRn. Here, the reference distance DEb is set in advance to determine the boundary between the distance to the target Tr for which it is necessary to prioritize the measurement of the reflection intensity IR and the distance to the target Tr for which it is necessary to prioritize the measurement of the reflection point distance DR, and is stored in the characteristic storage area 1*as* (see FIG. 14 described in the second embodiment). Thereby, it is read out in S400.

At this time, the estimation distance DE to the target Tr to be sensed may be estimated based on the reflection point distance DR measured by the light reception pixel 46 in a same frame as or an adjacent frame to the current measurement frame FM, in the scanning line in the same as the current measurement frame FM among the scanning lines corresponding to the past measurement frame FM. This estimation is based on the premise that the change in distance to the target Tr is small between the same scanning lines of the current measurement frame FM and the past measurement frame FM. The estimation distance DE may be estimated based on the reflection point distance DR measured by the light reception pixel 46 in a same frame as or an adjacent frame to the current measurement frame FM, in the scanning line immediately adjacent and close to the scanning origin OS with respect to the current measurement frame FM among the scanning lines corresponding to the past measurement frame FM. This estimation is based on the premise that the probability that the same target Tr will be detected by sensing is high between consecutive scanning lines in the current measurement frame FM and the past measurement frame FM.

The response range RR at the light reception pixel 46 for which the estimated distance DE to the target Tr estimated in this way is a short distance equal to or less than the reference distance DEb is set to the wider response range RRw, so that the accuracy is more prioritized in the measurement of the reflection intensity IR than the measurement of the reflection point distance DR. On the other hand, the response range RR at the light reception pixel 46 for which the estimated distance DE to the target Tr estimated in this way is a short distance exceeding the reference distance DEb is set to the narrower response range RRn, so that the accuracy is more prioritized in the measurement of the reflection point distance DR than the measurement of the reflection intensity IR. Although not shown in the drawing, the response range RR at the light reception pixel 46 at which the target Tr is not detected even by sensing is set to the narrower response range RRn in accordance with the latter long-distance case, so that the accuracy is more prioritized in the measurement of the reflection point distance DR than the measurement of the reflection intensity IR.

(Operation Effects)

Operation effects specific to the fourth embodiment described so far will be described.

According to the fourth embodiment, before acquiring the light reception signal waveform WR, the response range RR, which is the arrangement range of the SPAD 460 that permits response, is set for each light reception pixel 46 according to the estimation distance DE to the target Tr to be sensed. According to this, between the estimation of the reflection intensity IR based on the correlation of each output component WRr and WRo included in the light reception signal waveform WR and the measurement of the reflection point distance DR based on the light reception signal waveform WR, it is possible to adapt the response range RR for each light reception pixel 46 to the one according to the distance to the target Tr. Therefore, between the measurement of the estimated reflection intensity IR and the measurement of the reflection point distance DR, it is possible to appropriately select the measurement that prioritizes accuracy according to the distance to the target Tr.

According to the fourth embodiment, before the current acquisition of the light reception signal waveform WR, the response range RR (RRn) when the estimated distance DE to the target Tr to be sensed exceeds the reference distance DEb is set to be narrower than the response range RR (RRw) when the estimation distance DE is equal to or less than the reference distance DEb. According to this, when the target Tr is close to the target Tr, the measurement accuracy of the reflection intensity IR is prioritized due to the wide response range RR (RRw). On the other hand, under conditions where the target Tr is far away, it is possible to prioritize the measurement accuracy of the reflection point distance DR due to the narrow response range RR (RRn). Therefore, in the fourth embodiment, together with the output of distance image data and intensity image data according to the second embodiment, at least one of the setting result of the response range RR or the type of data for which accuracy is prioritized may be output.

Fifth Embodiment

A fifth embodiment is a modification of the first embodiment.

Figure 24:
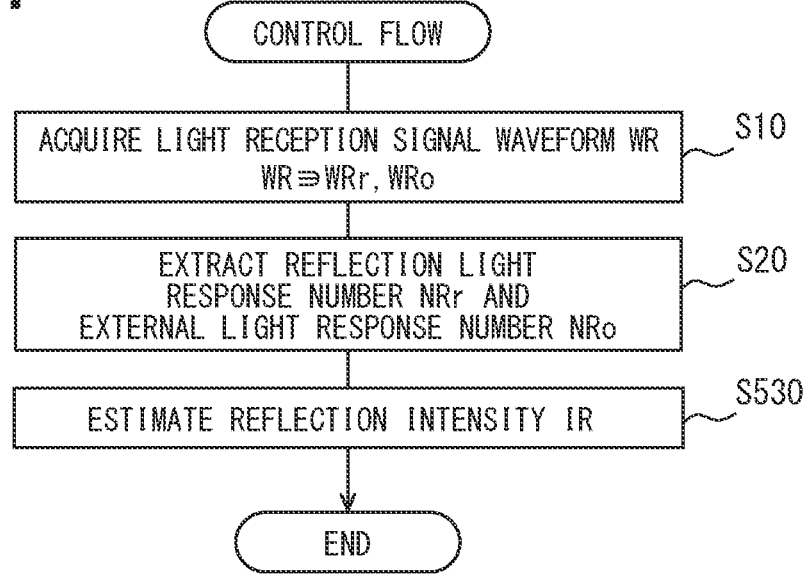
FIG. 24 is a flowchart showing a control flow according to a fifth embodiment.

As shown in FIG. 24, the control flow of the fifth embodiment executes S530 instead of S30. In S530, the intensity measurement block 110 estimates the reflection intensity IR of the received reflection light in the measurement frame FM for each light reception pixel 46 based on the correlation between the reflection light response number NRr and the external light response number NRo for each environmental temperature τ. At this time, the current environmental temperature τ is recognized using, for example, the detection result of the optical sensor 10 or a temperature sensor provided in the vehicle 5.

Figure 25:
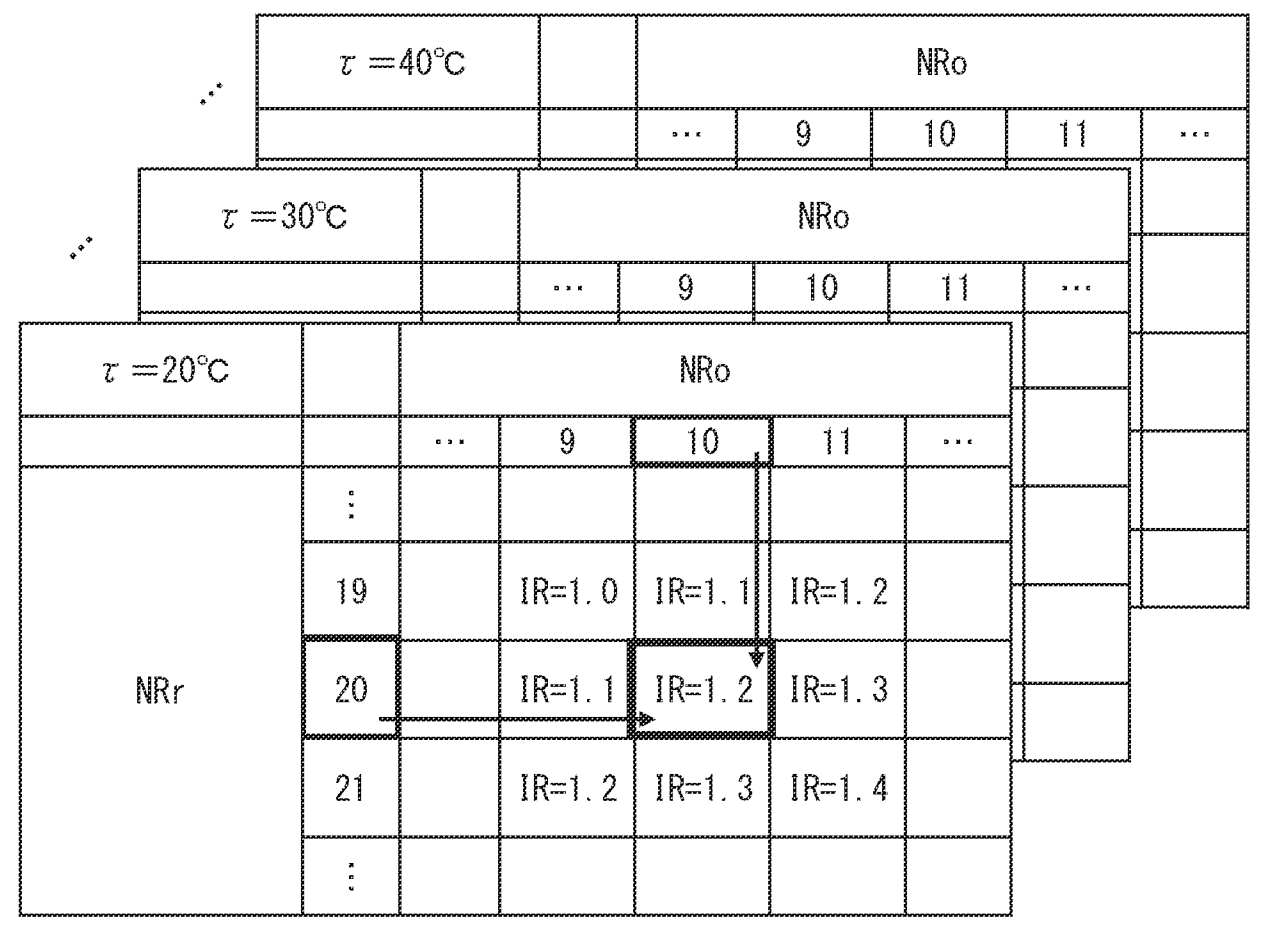

Here, as shown in FIG. 25, the intensity measurement block 110 may estimate the reflection intensity IR corresponding to the correlation pair of the reflection light response number NRr and the external light response number NRo at the current environmental temperature τ based on a matrix correlation table assumed and stored, for each environmental temperature τ in advance in the memory 1. The intensity measurement block 110 may estimate the reflection intensity IR corresponding to the reflection light response number NRr and the external light response number NRo at the current environmental temperature τ based on a three-dimensional correlation map and a correlation function equation of a second equation assumed and stored, for each environmental temperature τ, in advance in the memory 1*a*. Note that in the second equation, a1, a2, a3, a4 are coefficient parameters that are preset based on, for example, regression analysis or empirical rules.

(Second Equation)
(Operation Effects)

Operation effects specific to the fifth embodiment described so far will be described.

According to the fifth embodiment, the reflection intensity IR for each light reception pixel 46 is estimated based on the correlation between the reflection light response number NRr and the external light response number NRo for each environmental temperature τ. According to this, it is possible to estimate the accurate reflection intensity IR in consideration of, for each light reception pixel 46, the influence of the temperature characteristics regarding, for example, a light emission intensity of the light projector 22 that provides the irradiation light or the like and/or the influence of the temperature characteristics regarding, for example, a light reception sensitivity, a dead time, or the like of the SPAD 460 that receives the reflection light of the irradiation light. Therefore, it is possible to improve the measurement accuracy of the reflection intensity IR through such estimation. Note that the fifth embodiment may be combined with the second to fourth embodiments as a modification thereof.

Sixth Embodiment

A sixth embodiment is another modification of the first embodiment.

Figure 26:
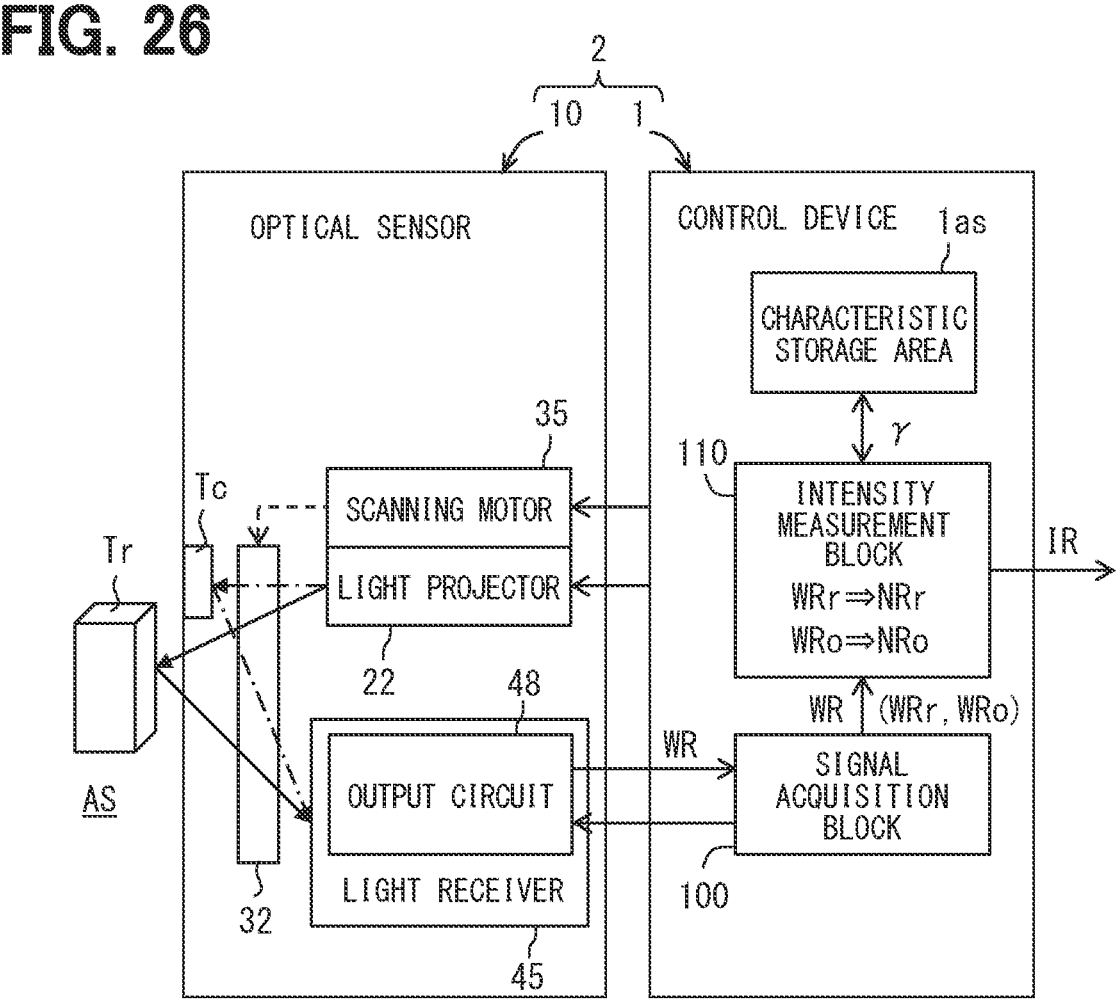
FIG. 26 is a schematic diagram showing a functional configuration of an optical sensor and a control device according to a sixth embodiment.

As shown in FIG. 26, in the sixth embodiment, a correction reflection target Tc is provided in the sensing area AS that is also set inside the optical sensor 10. The correction reflection target Tc is formed so as to be able to reflect the irradiation light projected from the scanning mirror 32 and re-enter the same mirror 32. Further, in order to achieve such optical characteristics, the correction reflection target Tc is placed at a location in a periphery of the optical window 12 in the housing 11 or at a location inside the housing 11 between the peripheral area and the scanning mirror 32.

Figure 27:
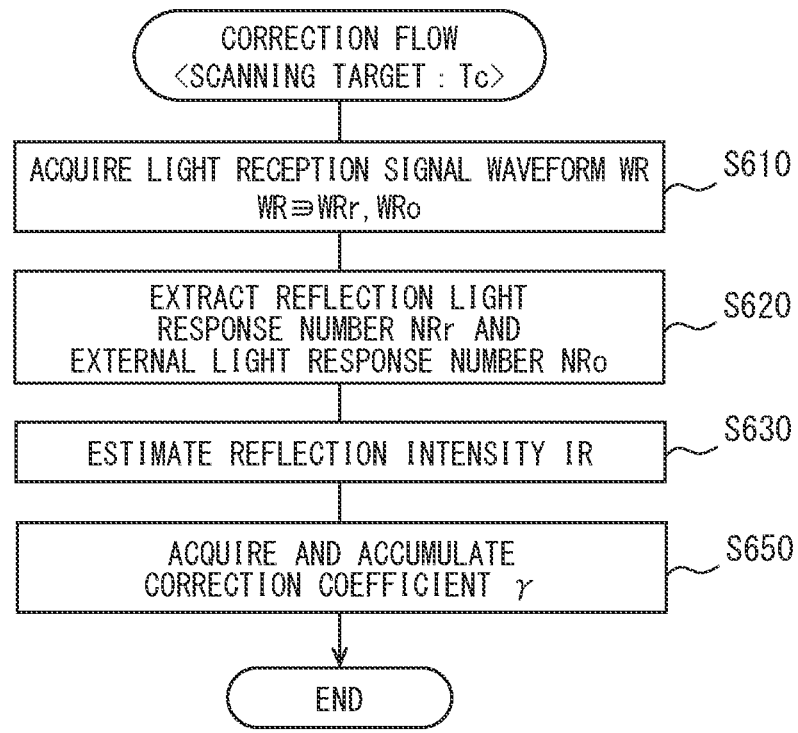
FIG. 27 is a flowchart showing a correction flow according to the sixth embodiment.
Figure 28:
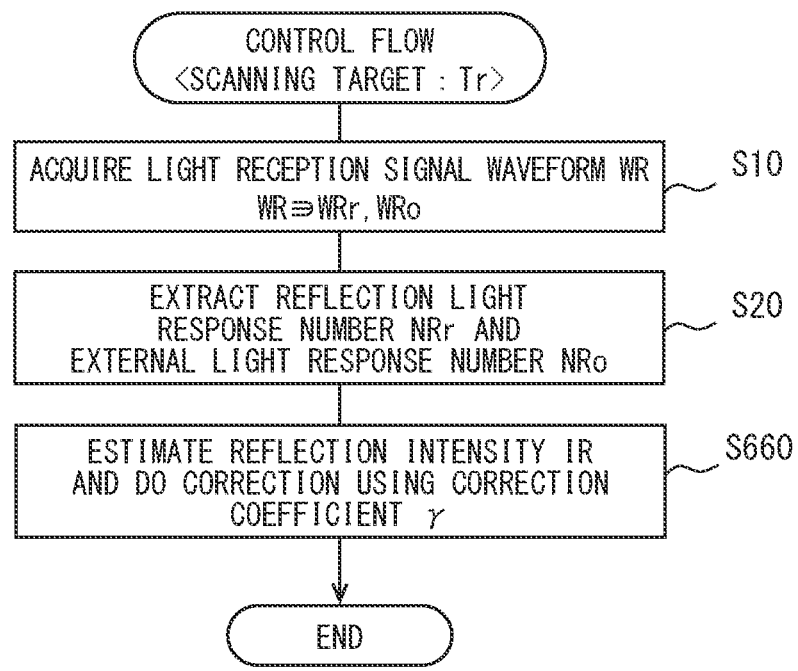
FIG. 28 is a flowchart showing a control flow according to a sixth embodiment.

In such a sixth embodiment, a control method for controlling the optical sensor 10 is executed according to the correction flow shown in FIG. 27 and the control flow shown in FIG. 28. Therefore, the correction flow shown in FIG. 27 will be described. The correction flow of the sixth embodiment is executed repeatedly for each irradiation period of the irradiation light or for a setting period longer than the irradiation period in the measurement frame FM of the scanning line in which the scanning target by the irradiation light is the correction reflection target Tc during the activation of the vehicle 5. Each "S" in the correction flow indicates one or more processes executed by one or more instructions included in the control program.

In S610, S620, and S630 of the correction flow, processes corresponding to S10, S20, and S30 of the control flow are respectively executed in the measurement frame FM of the scanning line for the correction reflection target Tc. Therefore, the correction flow moves to S650 after the execution of S630 is completed. In S650, the intensity measurement block 110 obtains the ratio IRb/IR between the reflection intensity IR estimated for the correction reflection target Tc in S630 and the reference intensity IRb as a correction coefficient γ. Here, the reference intensity IRb is set in advance based on, for example, a common design value (that is, ideal value) or an initial value for each product, or the like, stored in the characteristic storage area 1as as shown in FIG. 26, read by executing S650, and is read out by executing S650. In S650, the intensity measurement block 110 further accumulates the acquired latest correction coefficient α in the characteristic storage area 1as of the memory 1a.

Next, the control flow in FIG. 28 will be described. Similar to the first embodiment, in the control flow of the sixth embodiment in which the scanning target by the irradiation light is the target Tr, S660 is executed in place of S30. In S660, the intensity measurement block 110 corrects the reflection intensity IR estimated for the target Tr according to S30 by multiplying it by the latest correction coefficient α read from the characteristic storage area 1as as shown in FIG. 26. Note that in S650, the ratio IR/IRb is obtained as the correction coefficient γ, so that in the correction in S660, the reflection intensity IR may be divided by the latest correction coefficient γ.

(Operation Effects)

Operation effects specific to the sixth embodiment described so far will be described.

In the sixth embodiment, the ratio between the reflection intensity IR estimated for the correction reflection target Tc provided in the sensing area AS inside the optical sensor 10 and the reference intensity IRb is obtained as the correction coefficient γ. Therefore, according to the sixth embodiment, the reflection intensity IR estimated for the target Tr is corrected by the correction coefficient γ. According to this, even when a characteristic change such as aging or temperature change occurs in the projector 22 that provides the irradiation light and/or the SPAD 460 that receives the reflection light of the irradiation light, it is possible to estimate the accurate reflection intensity IR in consideration of the characteristic change for the target Tr. Therefore, it is possible to improve the measurement accuracy of the reflection intensity IR through such estimation. Note that the sixth embodiment may be combined with the second to fifth embodiments as a modification thereof.

Other Embodiments

Although multiple embodiments have been described above, the present disclosure is not to be construed as being restricted to these embodiments, and can be applied to various embodiments and combinations without departing from the spirit of the present disclosure.

The dedicated computer constituting the control device 1 may include at least one of a digital circuit or an analog circuit as a processor. The digital circuit is at least one type of, for example, an application specific integrated circuit (ASIC), a field programmable gate array (FPGA), a system on a chip (SOC), a programmable gate array (PGA), a complex programmable logic device (CPLD), and the like. In addition, such a digital circuit may include a memory storing a program.

In S10 by the signal acquisition block 100 of the modification, irradiation of the irradiation light may be stopped for the same scan line as the current measurement frame FM, and an additional measurement frame FM may be performed to acquire the light reception signal waveform WR containing only the external light output component WRo. In this case, in S20 by the intensity measurement block 110, the external light response number NRo may be extracted from the average voltage amplitude of the external light output component WRo in the additional measurement frame FM, or the average voltage amplitude of the external light output component WRo in the additional measurement frame FM and the current measurement frame FM.

In S20 by the intensity measurement block 110 of the modification, the reflection light output component WRr and the external light output component WRo may not be demultiplexed from the light reception signal waveform WR, and the corresponding number of responses NRr and NRo may be directly extracted from the output components WRr and WRo. In S200 by the response setting block 120 of the modification, a response range RR (RRw, RRn) may be set according to the external light intensity detected in the current measurement frame FM by, for example, an external light sensor different from the optical sensor 10.

In S200 by the response setting block 120 of the modification example, the wide response range RRw may be variably set so that it becomes narrower as the past response number NRop increases, as long as it becomes wider than the narrow response range RRn. In S200, S300, and S400 by the response setting block 120 of the modification, the wide response range RRw may be set to the entire area of each light reception pixel 46. In S200 by the response setting block 120 of the modification, the narrow response range RRn may be fixed regardless of changes in the past response number NRop, as long as it is narrower than the wide response range RRw. In S200, S300, and S400 by the response setting block 120 of the modification, the narrow response range RRn may be set so as to avoid the center position of each light reception pixel 46 as long as it is narrower than the wide response range RRw. Thereby, an occurrence of measurement errors due to multiple reflections between the short distance target Tr and the optical sensor 10 may be prevented. In S200 by the response setting block 120 of the modification, when the intensity distribution is prevented for each column of the SPAD 460 or the like, a process for setting one type of the response range RR may be executed. The process may be a process of setting the response ranges RRw and RRn to the same range such as a process of setting the wide response range RRn according to the response range RRw.

Figure 29:
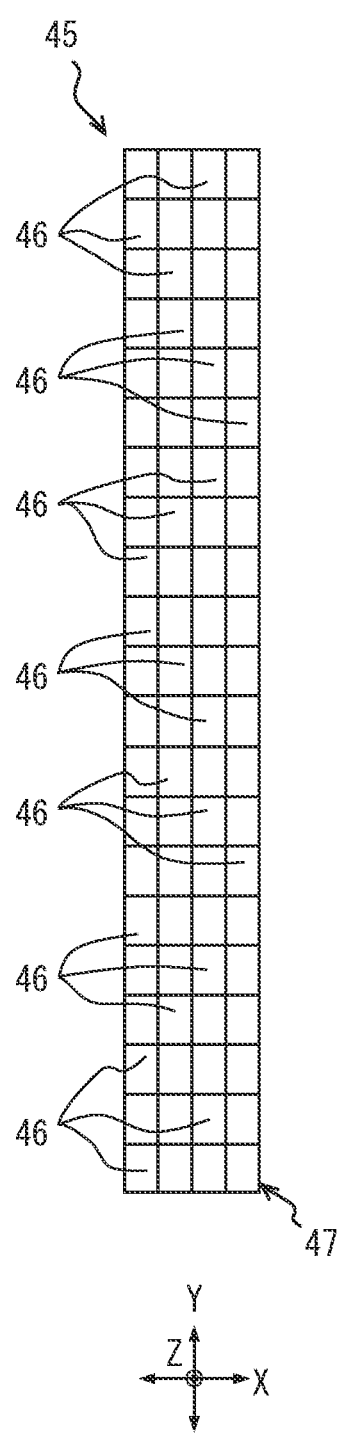
FIG. 29 is a schematic diagram of a light receiver according to a modification of FIG. 5.

As the optical sensor 10 of the modification, various scanning methods such as not only of the mechanical swing type limited in the horizontal direction, but also of the mechanical swing type limited in the vertical direction or the mechanical swing type in both the horizontal and vertical directions may be employed. As the optical sensor 10 of the modification, various two-dimensional or three-dimensional scanning methods, such as a rotary type, a MEMS (Micro Electro Mechanical Systems) type, or a Lissajous type may be employed. Depending on the scanning method of the optical sensor 10, in S200, S300, and S400 by the response setting block 120 of the modification, the response range RR may be adjusted to the Y-axis direction corresponding to the vertical direction, instead of or in addition to the X-axis direction corresponding to the horizontal direction. Here, for example, when the scanning method of the optical sensor 10 is a mechanical swing type limited in the vertical direction, the response range RR may be adjusted in the Y-axis direction. In the light receiver 45 of the optical sensor 10 of the modification, as shown in FIG. 29, a plurality of light reception pixels 46 may be arranged in a two-dimensional array in the X-axis direction and the Y-axis direction.

S200 by the response setting block 120 of the modification is executed between S20 and S30, so that the external light response number NRo extracted in the current measurement frame FM in S20 may be used for comparison with the determination criterion NRb instead of the past response number NRop. In this case, the light reception signal waveform WR acquired in S10 by the signal acquisition block 100 includes the reflection light output component WRr and the external light output component WRo output from the SPAD 460 within the entire area of each light reception pixel 46. Therefore, in S30 by the intensity measurement block 110 in this case, the response number NRr, NRo within the response range RR (RRw, RRn) set in S200 may be extracted from the response number NRr, NRo extracted in the current measurement frame FM in S20, respectively. The extracted number may be used for estimating the reflection intensity IR. In addition, in S240 by the distance measurement block 130 in this case, of the reflection light output components WRr demultiplexed in S20, the reflection light output component WRr corresponding to the reflection light response number NRr within the response range RR (RRw, RRn) is extracted. The peak timing tp of the extracted component may be used to obtain the reflection point distance DR.

In S200 by the response setting block 120 of the modification, three or more ranges with different widths may be set as the response range RR according to the external light intensity (past response number NRop). In S200 by the response setting block 120 of the modification, the response range RR may be set to change continuously according to the external light intensity (past response number NRop). In S300 by the response setting block 120 of the modification, three or more ranges with different widths may be set as the response range RR for each scanning line of the light reception pixel 46. In S400 by the response setting block 120 of the modification, three or more ranges with different widths may be set as the response range RR according to the estimation distance DE to the target Tr to be sensed. In S400 by the response setting block 120 of the modification, the response range RR may be set to change continuously according to the estimation distance DE to the sensed target Tr.

In the modification, the mobile object to which the control device 1 is applied may be, for example, an autonomous traveling vehicle that can remotely control travel on a travel route. The control device 1 in the modification may be applied to an environment other than the mobile object. In addition to the embodiments described so far, the embodiments and modifications described above may be executed as a semiconductor device (for example, a semiconductor chip or the like) having at least one processor 1b and at least one memory 1a.

The invention claimed is:

1. A control device for controlling an optical sensor that includes a plurality of light reception pixels, each light reception pixel including a plurality of single photon avalanche diodes (SPADs), and that receives light from a sensing area, the control device comprising a processor; and
a memory coupled to the processor and storing program instructions that when executed by the processor cause the processor to at least:
acquire, for each light reception pixel, a light reception signal waveform including:
    a reflection light output component from the plurality of SPADs that have responded by receiving reflection light of irradiation light to the sensing area from the optical sensor; and
    an external light output component from the plurality of SPADs that have responded by receiving external light from the sensing area; and
estimate, for each light reception pixel, a reflection intensity of the reflection light based on a correlation between a reflection light response number that is a response number of the plurality of SPADs that output the reflection light output component and an external light response number that is a response number of the SPADs that output the external light output component.

2. The control device according to claim 1, wherein estimation of the reflection intensity includes extraction of the reflection light response number and the external light response number from the reflection light output component and the external light output component demultiplexed from the light reception signal waveform, respectively.

3. The control device according to claim 1, wherein the processor is further caused to:
    set a response range that is an arrangement range of the plurality of SPADs that permit a response according to an intensity of the external light for each light reception pixel, before acquiring the light reception signal waveform; and
    measure a reflection point distance of the reflection light based on the light reception signal waveform.

4. The control device according to claim 3, wherein a setting of the response range includes, before current acquisition of the light reception signal waveform, a setting of the response range in a case where a past response number exceeds a determination criterion to be narrower than the response range in a case where the past response number is equal to or less than the determination criterion, and
the past response number is the response number of the external light corresponding to the external light output component in the light reception signal waveform in past acquisition.

5. The control device according to claim 4, wherein the setting of the response range includes a setting of the response range to be narrower as the past response number increases in the case of exceeding the determination criterion.

6. The control device according to claim 1, wherein the processor is further caused to:
    set, for each light reception pixel, a range with a different width as a response range that is an array range of the SPADs that permit a response, before acquiring the light reception signal waveform; and
    measure a reflection point distance of the reflection light based on the light reception signal waveform.

7. The control device according to claim 1, wherein the processor is further caused to:
    set a response range that is an arrangement range of the plurality of SPADs that permit a response according to an estimation distance to a sensed target for each light reception pixel, before acquiring the light reception signal waveform; and measure a reflection point distance of the reflection light based on the light reception signal waveform.

8. The control device according to claim 7, wherein a setting of the response range includes, before acquisition of the light reception signal waveform, a setting of the response range in a case where the estimation distance exceeds a reference distance to be narrower than the response range in a case where the estimation distance is equal to or less than the reference distance.

9. The control device according to claim 1, wherein estimation of the reflection intensity includes estimation of the reflection intensity for each light reception pixel based on a correlation between the reflection light response number and the external light response number for each environmental temperature.

10. The control device according to claim 1, wherein the processor is further caused to estimate the reflection intensity with respect to each of a target existing in the sensing area outside the optical sensor and a correction reflection target provided in the sensing area inside the optical sensor, estimation of the reflection intensity regarding the correction reflection target includes acquisition of a ratio between the reflection intensity estimated for the correction reflection target and a reference intensity as a correction coefficient, and estimation of the reflection intensity regarding the target includes correction of the reflection intensity estimated for the target by the correction coefficient.

11. A control method executed by a processor for controlling an optical sensor that includes a plurality of light reception pixels, each light reception pixel including a plurality of single photon avalanche diodes (SPADs), and that receives light from a sensing area, the method comprising acquiring, for each light reception pixel, a light reception signal waveform including:
 a reflection light output component from the plurality of SPADs that have responded by receiving reflection light of irradiation light to the sensing area from the optical sensor; and
 an external light output component from the plurality of SPADs that have responded by receiving external light from the sensing area; and estimating, for each light reception pixel, a reflection intensity of the reflection light based on a correlation between a reflection light response number that is a response number of the plurality of SPADs that output the reflection light output component and an external light response number that is a response number of the SPADs that output the external light output component.

12. A non-transitory tangible storage medium storing a control program for controlling an optical sensor that includes a plurality of light reception pixels, each light reception pixel including a plurality of single photon avalanche diodes (SPADs), and that receives light from a sensing area, the control program storing program instructions that when executed by a processor cause the processor to at least:

acquire, for each light reception pixel, a light reception signal waveform including:
 a reflection light output component from the plurality of SPADs that have responded by receiving reflection light of irradiation light to the sensing area from the optical sensor; and
 an external light output component from the plurality of SPADs that have responded by receiving external light from the sensing area; and estimate, for each light reception pixel, a reflection intensity of the reflection light based on a correlation between a reflection light response number that is a response number of the plurality of SPADs that output the reflection light output component and an external light response number that is a response number of the SPADs that output the external light output component.

* * * * *